March 10, 1964     W. W. BUECHNER     3,124,051
PHOTOGRAPHIC APPARATUS

Filed April 19, 1960     6 Sheets-Sheet 1

INVENTOR.
BY Werner W. Buechner

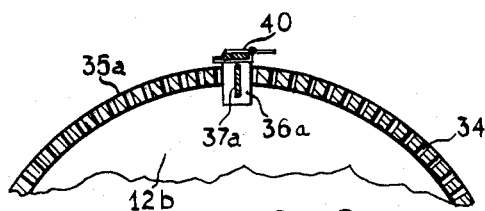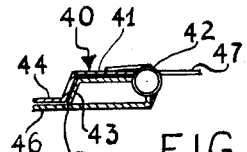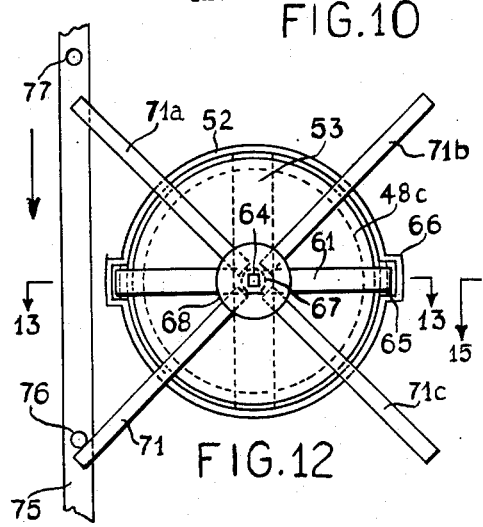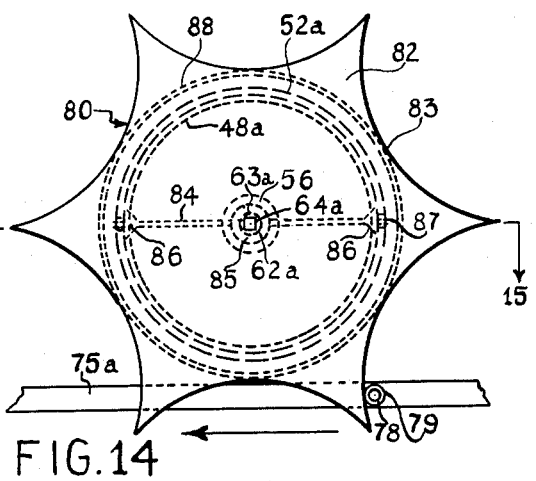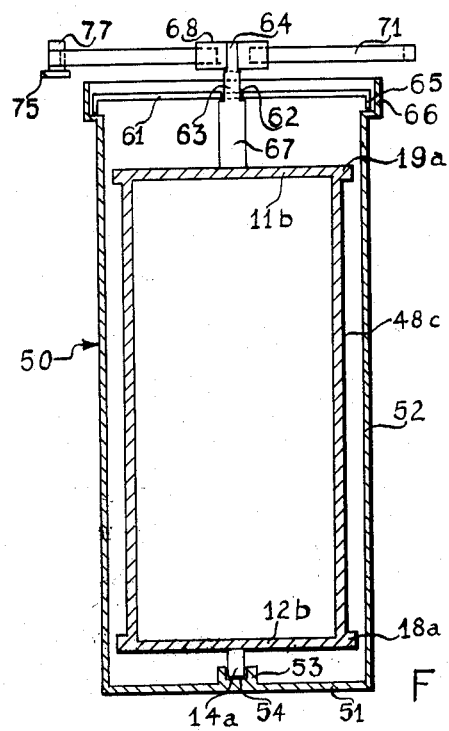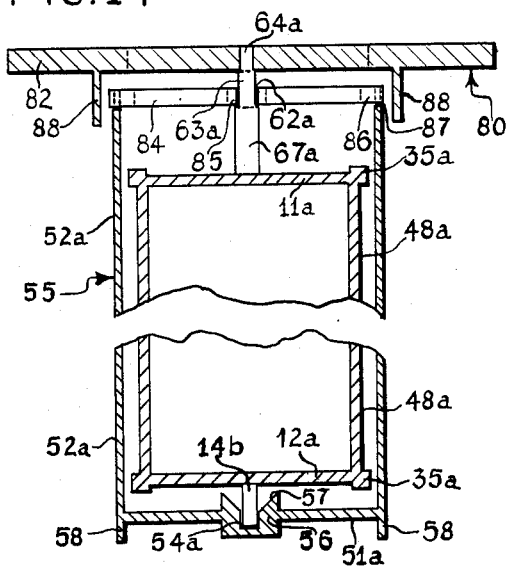

March 10, 1964 W. W. BUECHNER 3,124,051
PHOTOGRAPHIC APPARATUS
Filed April 19, 1960 6 Sheets-Sheet 3
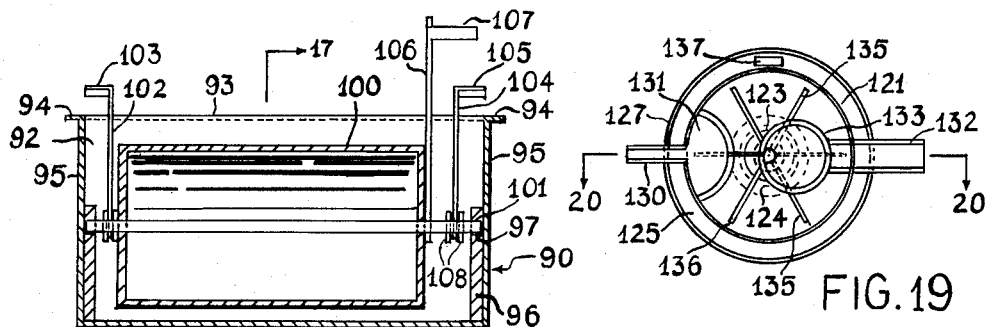
FIG. 16
FIG. 19
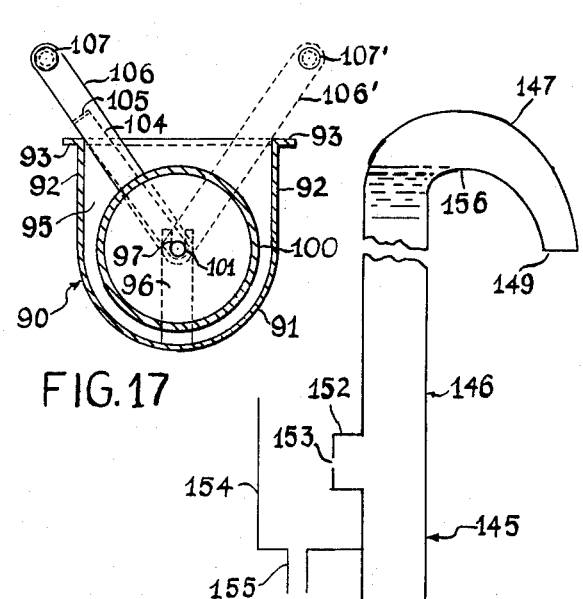
FIG. 17
FIG. 18
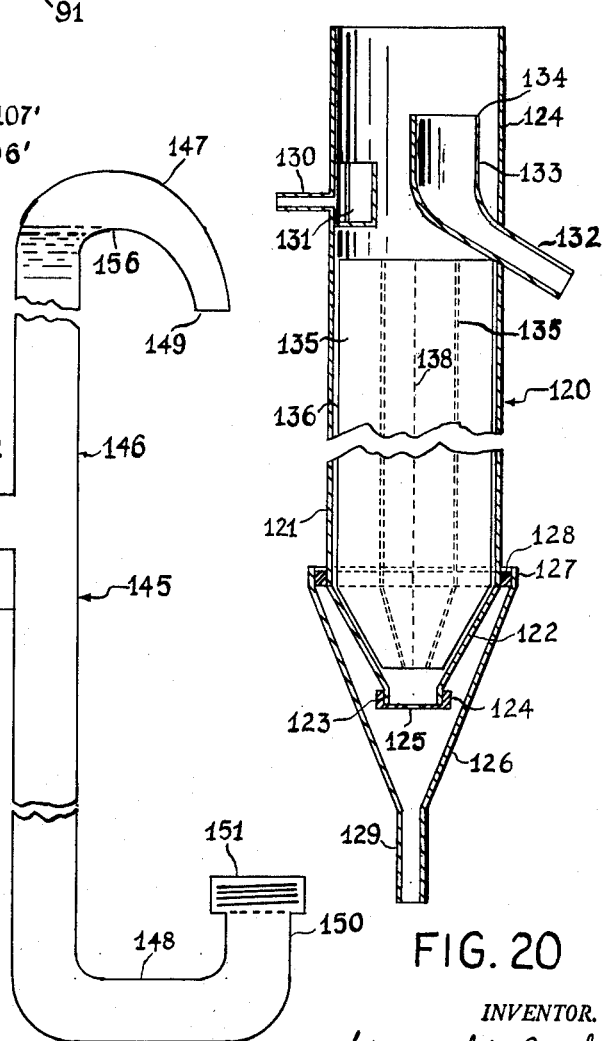
FIG. 20
FIG. 21
INVENTOR.
Werner W. Buechner
BY March 10, 1964 W. W. BUECHNER 3,124,051
PHOTOGRAPHIC APPARATUS
Filed April 19, 1960 6 Sheets-Sheet 4

INVENTOR.
Werner W. Buechner
BY

March 10, 1964 W. W. BUECHNER 3,124,051
PHOTOGRAPHIC APPARATUS
Filed April 19, 1960 6 Sheets-Sheet 5

INVENTOR.
Werner W. Buechner
BY

March 10, 1964 W. W. BUECHNER 3,124,051
PHOTOGRAPHIC APPARATUS
Filed April 19, 1960 6 Sheets-Sheet 6

INVENTOR.
Werner W. Buechner

United States Patent Office 3,124,051
Patented Mar. 10, 1964

3,124,051
PHOTOGRAPHIC APPARATUS
Werner W. Buechner, 2205 Jenkins Drive, Midland, Mich.
Filed Apr. 19, 1960, Ser. No. 23,313
25 Claims. (Cl. 95—96)

This invention relates to method and apparatus for the treatment and processing of photographic sheet materials. Particularly, the invention is concerned with an improved method and apparatus for the processing of multilayer color materials, permitting the obtention of consistent, reproducible results in inexpensive, simple equipment.

Fully automatic equipment for the processing of photographic materials has been devised and is commercially available. Such automatic equipment has found ready acceptance in the commercial processing of color film and paper base material and has become indispensable in large-scale commercial operation of the various color processes. Mostly these commercial machines are designed to process large, continuous rolls of film or paper base material and have all the provisions necessary for a close control of the many variables in the process such as accurate temperature control, exact timing of the various steps of the treatment in the processing solutions and in the intermediary and final washing steps, control of the composition and effectiveness of the processing solutions, especially of the developer solutions.

The initial high price and the adaptation of the machines to the handling of large quantities of material, generally in the form of continuous rolls of film or paper base material make this type of equipment unsuitable for the amateur photographer and for the customs finisher, who handle only small quantities of materials and particularly individual sheets of precut color materials at a time.

For the handling and processing of quantities of pre-cut sheet materials in commercial finishing operations, tanks and associated special equipment have been devised and adapted to the requirements of commercial use. However, the initial investment in the specialized equipment is still high. This in conjunction with the relatively large space requirements also make this equipment unsuitable for the amateur photographer who may wish to process only an occasional few sheets of material in one session. The tanks used in this processing equipment have, by necessity, the width and height of the largest sheet to be processed therein, with a resultant liquid capacity of several quarts or gallons, depending on the maximum size of the sheets which they are designed to handle. Regardless of the number of sheets to be processed, whether it is one or a few or a hundred, the tanks must be filled to capacity with the rather expensive processing solutions. Though reuse of the solutions is possible, extended storage, particularly of the sensitive developer solutions, will change the processing characteristics and may in extreme cases render the solution unsuitable for later critical work.

Time consuming adjustment of the temperature of the processing solutions in the tank is required, or, in the alternative, large water baths and expensive temperature control devices, water mixing valves and other equipment must be provided if the temperature of the processing solutions is to be maintained constant and at the accurate level over the duration of each processing session which may extend over many hours.

Accordingly, the Eastman Kodak Company, a major manufacturer of photographic color materrials, recommends in its "Ektacolor Data Book" (Kodak publication No. E–66, 1958) the so-called tray-processing method for use by the amateur photographer. The main advantage of this method is that at least some components of the required equipment are usually available to the amateur darkroom operator and only an additional reasonable investment will complete the equipment needed for the complex color processes. This method permits the obtention of satisfactory, good quality color prints and films of any desired size. However, due to the great number of steps forming part of the color processes and due to the intrinsic size of the flat trays, the space requirements are considerable even with trays accommodating only medium sized sheet materials such as those of the standard 11 by 14 inches size color printing paper. Accurate temperature control is difficult to achieve without the use of bulky water baths, automatic water mixing valves or accurate control of the temperature of the darkroom at the desired 75° F. level. The various batches of wash water require separate temperature adjustment unless a continuous source of temperature controlled running water from a water mixing valve or similar expensive equipment is available. All this adds to the required initial investment, space requirement and complexity.

In the practice of the tray process, the operator carries the sheets through a multiplicity of steps constantly controlling and adjusting temperature, tilting trays and shifting prints at accurate time intervals within the tray and from one tray to the next. This must be carried out at exact reproducible processing conditions from one print to the next, from one batch to the next, and from one processing session to the following which may be spaced days, weeks or months apart. Only absolutely accurate control of all processing conditions guarantees pleasing results. All the processing variables must not only be accurately maintained but also reproducible because generally positive printing processes such as the Ektacolor printing process are based on empirical exposure and filter data which are established and recorded in preliminary runs or which are taken from the results of prior processing sessions.

Because of the exposure to air of a large surface area of the air sensitive developer in the tray method only fresh developer should be used in the interest of reproducibility. This adds to the cost of the process because it will be rarely possible to exhaust the required quantities of the expensive processing and developing solutions applied in any one session of the tray process. The operator cannot avoid contacting the processing solutions by his hands. Because of possible irritation the manufacturer recommends the use of rubber gloves with the resultant inconvenience, loss of feel etc.

This and many other complications encountered in the operation of the tray process make it apparent that completely satisfactory results will be achieved only by the highly skilled and most versatile operator. The average amateur photographer who occasionally likes to do some darkroom work and who wishes to produce, for his own enjoyment, small numbers of highest quality, pleasing and satisfying colorprints from his own negatives to his own taste and who does not have the time and inclination of acquiring all the skills and experience, to become completely expert in the tray processing method, will not be attracted by the available methods.

It is therefore the primary object of the present invention to provide a simple, semiautomatic process for the treatment and especially for the development of photographic sheet materials. It is a further object of the invention to provide a conveniently practiced process for the production of photographic prints on precut color sheet materials, which process is particularly adapted to the requirements of the less skilled photographic amateur. Another object of the invention is the provision of a photographic process which lends itself to automatic or semiautomatic operation and control of the treating conditions with a maximum of reproducibility of the final product.

A further object of the invention is the provision of an apparatus which is inexpensive, space saving and adapted to semiautomatic operation of multistep color processes, with considerable savings in the consumption of treating solutions and chemicals. Still another object of the invention is the provision of an apparatus which permits the operator to maintain reproducible, preset operating conditions with a minimum amount of attention during the photographic treating operation.

Other objects of the invention will become apparent from the following description and from the accompanying drawings.

Generally, the objects of the invention are accomplished by a process which comprises bending a sheet of photographic material into a cylindrical configuration such that it forms at least part of a substantially cylindrical plane, submerging the cylidrical sheet at least in part in a photographic treating liquid in such manner that the liquid extends from one circular edge of the sheet to the opposite circular edge and maintaining the circular configuration of the sheet substantially unchanged while the sheet is contacted and treated with the treating liquid.

The process can readily be put into practice by the use of a novel device provided by the present invention. The device comprises a substantially cylindrically shaped carrier or support adapted to receive a sheet of photographic material around its cylindrical plane and means for securing the sheet of photographic material temporarily and removeably to said carrier or support. The circumference of the cylidrical plane of said carrier or support is preferably not shorter than the width, and the extension of the carrier or support in the direction of the cylinder axis is preferably not shorter than the length, of the photographic sheet material of the maximum size for which the carrier or support is designed.

The accompanying drawings show various modifications of the apparatus of the invention and extensions thereof without being restricted thereto.

Figure 9:
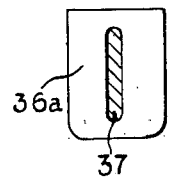
Figure 7:
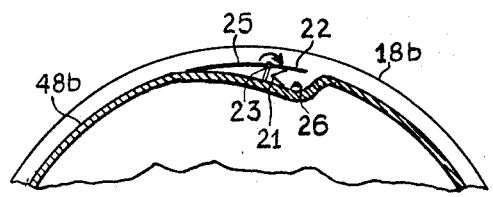
Figure 8:
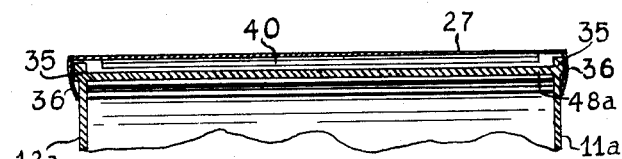

FIG. 7 is a sectional view of a portion of a drum-type support cut perpendicularly to the central axis. FIG. 8 is a coaxial section of a portion of a drum-type support and of the clamp contained thereon. FIG. 9 is an elevational side view of the outer perpendicular extension of the clamp shown in FIG. 11. FIG. 10 is an elevational view of a portion of another modification of the closed-drum type support.

FIG. 12 is a plan view and FIG. 13 a vertical section of an upright vessel which is adapted to receive the support of the invention and cylindrical sheet contained thereon for the photographic treatment. FIG. 14 is a top plan view and FIG. 15 a vertical section of another modification of the upright vessel and cylindrical support with a driving gear attached to the support.

FIG. 16 is a sectional view and FIG. 17 a transversal vertical section of the horizontal trough. FIG. 18 depicts a vertical section of a portion of another modification of the horizontal trough.

FIG. 19 is a top plan view and FIG. 20 a vertical section of a water metering device which may be used in conjunction with the process or apparatus of the present invention. Another modification of a water metering device is represented schematically by FIG. 21 in vertical section.

Figure 22:
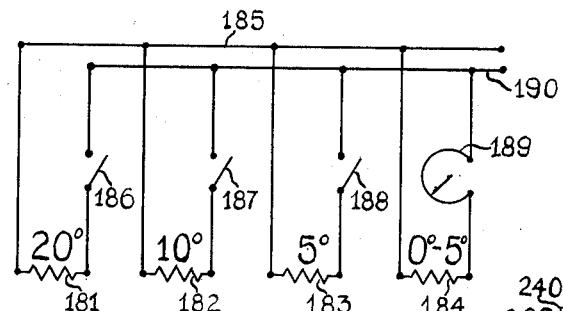
Figure 23:
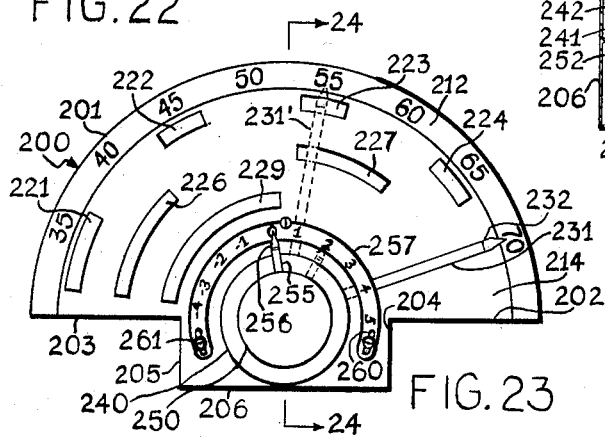
Figure 27:
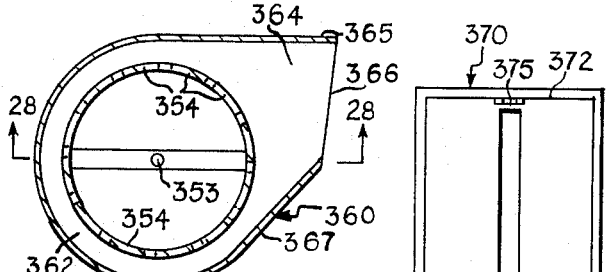
Figures 28, 29:
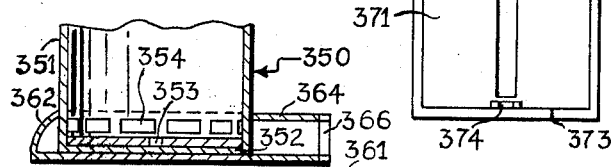

FIG. 22 is a schematic representation of an electrical temperature control arrangement which may be used in conjunction with the water metering device. FIG. 23 is a top plan view and FIG. 24 a vertical section of a modification of a switching device, forming part of the temperature control arangement. FIG. 25 is a vertical section and FIG. 26 a top plan view of a heating chamber which likewise may form part of the temperature control arrangement of the present invention. FIG. 27 is a top plan view and FIG. 28 is a vertical sectional view of an upright washing vessel contained in a water conduit. FIG. 29 is a top plan view of a horizontal trough modified as a washing vessel.

Figure 30:
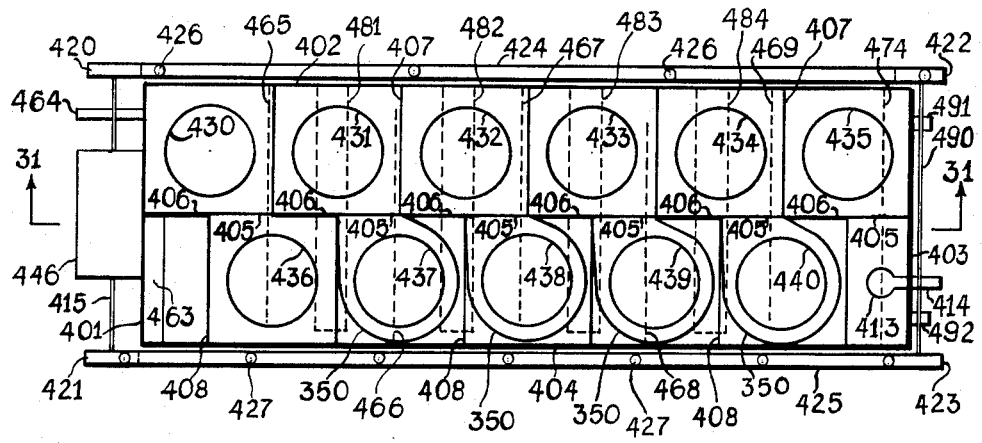
Figure 31:
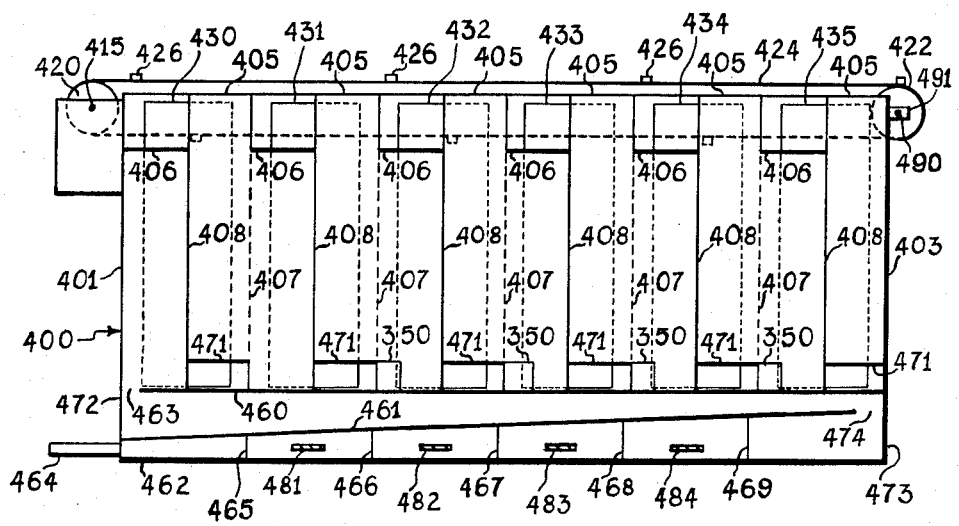

FIG. 30 rerpesents a top plan view and FIG. 31 a vertical sectional view of a composite water bath and heating chamber containing a multitude of the upright treating and washing vessels.

Figure 32:
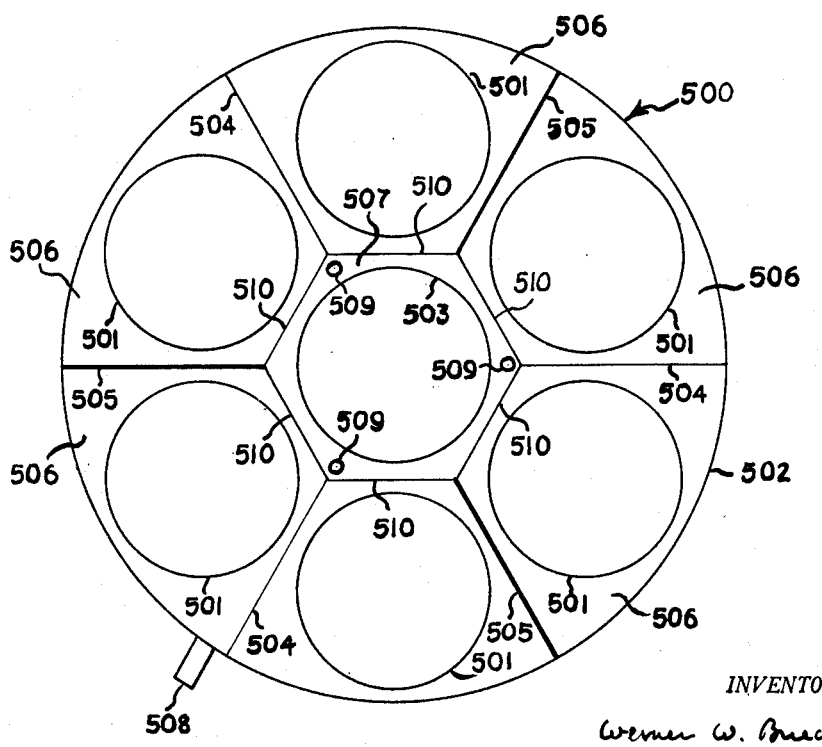

FIG. 32 is a schematic representation of a top plan view of the circular embodiment of the waterbath containing upright treating vessels in individual communicatively connected cells.

The novel process and apparatus of the present invention may be widely used in photographic liquid treatments and especially in the development and fixing of flexible photographic positive and negative sheet materials such as films, reversal films and paper base materials. The process and apparatus of the present invention are especially useful and beneficial in their application to the more recently introduced photographic color processes and they are particularly adapted to the processing of color positive and negative multilayer color sheet and cut films as well as to the processing of multilayer positive color printing materials in sheet or cut form particularly those on a paper base such as Kodak Ektacolor paper (formerly called type C positive printing paper). My invention includes many modes of operation and many modifications of the process and apparatus which make it particularly suited for application in the said multistep color developing processes.

Prefatory to a detailed description of the process and apparatus of the invention some of the more important terms used herein will be explained in order to provide a better understanding of the nature of the invention and of its scope.

The process of the present invention is primarily concerned with the treatment of photographic sheet materials, i.e. such materials which have definite size limitations. The sheets may be square or rectangular pieces of photographic material. Generally one dimension in the plane of the photographic sheet materials is larger than the second dimension. This applies particularly to the commercially sold photographic sheet materials which mostly have an oblong shape with somewhat greater length than width. The two dimensions may differ by an amount which is in the range from 10 to 50 percent of that of the shorter dimension. In exceptional cases the longer dimension may be up to twice the length of the shorter one and even a small multiple of the smaller dimension e.g. up to 3, 4 or 5 times the length of the smaller dimension. However, if the longer dimension exceeds the smaller dimension by more than 5 times its length, such material will, for the purposes of the present invention be considered as a continuous material rather than a sheet material. The benefits and advantages of the present invention will be realized to the best advantage with materials which have a length to width ratio in the range between 2 to 1 and 1 to 1. Irregular, non-rectangular shapes such as circular, oval, polygonal or other shapes may also be employed.

The sheet material useful in the present invention may be obtained in precut form such as the commercial cut films and sheets of photographic paper or it may be cut from continuous rolls at any time before the material is subjected to the treating process of the present invention.

The photographic sheet material may be of any desired nature or composition and may serve any desired purpose. It may be positive or negative or reversal material, black and white or color, single layer or multilayer. It may be contained on any desired flexible base material. To mention a few, the base may be cellulose acetate, nitrocellulose, polyester such as poly (ethyleneterephthalate) or paper. The base may be opaque or transparent as the case may be. As stated hereinbefore, the invention is particularly adapted to be used with the positive color printing processes such as the processes recommended for the printing of color negatives on Kodak Ektacolor paper, where it offers the greatest and most striking advantages and benefits over the processes and apparatus of the prior art.

The term "treating liquids" comprises a multitude of liquid media which are capable of accomplishing a desired change or alteration in the photographic sheet material. They are mostly aqueous solutions containing in a dissolved state suitable chemicals or combinations of chemicals which are capable of developing latent pictures or designs contained in the light sensitive layer, or layers, or which are capable of fixing, bleaching, stabilizing, buffering, or performing many other photographic steps. They may also be used to deposit certain chemicals on or in the sheet materials (in the photographically active layer or layers or in the base), such as dyes, metals or metal ions, couplers and other organic intermediates, or they may be capable of dissolving or removing one or more constitutents or impurities contained on or in the sheet material or in the photographically active layer or layers. Thus also water (tap water or distilled water) with or without suitable additives is, for the purposes of the present invention a treating liquid. Sometimes also organic solvents or other non-aqueous liquids may be the main constituent of the treating fluids useful in this invention.

The terms "cylindrical configuration" or "circular configuration" as used herein mean that the sheet material is formed into a full or complete cylinder or into any part of a cylinder or cylinder plane respectively, with the limitation that the usable area of the material (the area covered by a photographic—latent or actual—representation, design, pattern etc.) forms the plane of the cylinder without substantial overlapping. If two opposing or "vicinal" edges of the sheet material (or its usable area respectively) touch each other or are lying in the same radial plane the cylinder is for the purposes of the invention full or complete. However, the cylinder may also be incomplete, leaving a gap of any desired width between the two opposing or vicinal edges which lie in or close to the cylindrical plane. Sheet materials covering only three quarters or down to one half or one quarter or less of the circumference of the cylindrical plane are still within the meaning of the term. As stated there should be no substantial overlapping of the ends of the material, and particularly any of the spiral configurations, wherein the photographic material forms a continuous spiral with a multiplicity of overlapping layers are not comprised in the definition "cylindrical configuration" as used herein. However, as will be shown, these continuous materials may, under certain circumstances and with proper modification be processed in the apparatus of this invention.

The terminology "substantially cylindrical" is meant to comprise also such configurations which deviate in some minor way from the ideal cylindrical configuration of the sheet material. So, for instance, may the circular or cylindrical configuration be modified to form a prism, the cross section of which may be a regular or irregular polygon such as a hexagon or octagon. The prismatic forms should preferably be shaped such that their edges parallelling the length axis fall readily into a cylindrical plane of similar dimensions. The term "substantially cylindrical" comprizes furthermore such forms which are derived from an ideal cylindrical configuration by deformation such as in configurations having an oval cross section. Similarly, it comprizes cylindrical configurations which have been deformed by deflection of one or both vicinary edges of the sheet out of the cylindrical plane. The latter deviation or modification of the substantially cylindrical configuration is of particular importance in the practical operation of the invention, as will be described and shown hereinafter in more detail.

The terminology "maintaining the cylindrical configuration" is meant to denote that no substantial changes of the cylindrical or substantially cylindrical configuration, as defined above, should be permitted to occur or to be made during the treatment in the liquid medium. It cannot always be avoided that slight deformation takes place, as by the fact that the sheet material may change its dimensions when it is contacted with the treating liquid. This is particularly true with paper base materials which have a tendency to expand and swell when they are contacted with water or aqueous liquids. The deformation caused by the extension or shrinkage of the sheet material is tolerable and does not negatively affect the operation of the invention and is therefore to be considered as falling within the realm of the terminology "maintaining the configuration."

It need not be mentioned that generally all areas of the sheet material must be contacted with the treating liquid in order to achieve uniform results. This does, however, not mean that it is necessary in all cases to completely submerge the cylindrical sheet material into the treating fluid when it is processed in accordance with the present invention. The cylindrical sheet material may be submerged in part only, if the cylinder axis is positioned horizontally or substantially horizontally. As is readily apparent, submersion of a small portion of the "horizontal" cylindrical sheet material will, upon rotation of the cylinder around its length axis, successively provide contact of each section of the sheet material with the treating liquid. Continuous rotational movement thus permits effective treatment of all areas of the sheet of photographic material due to its substantially cylindrical configuration. This mode of operation will be preferred, however, only if the treating fluid or the treated photographic layer or layers are not sensitive to air, particularly to oxygen which in some photographic processes would affect the photographic layer and/or the treating fluid contained thereon or therein, causing cloudiness or discoloration of the picture area or other undesirable effects and side reactions.

The cylindrical sheet material may be inserted into the treating liquid in any desired orientation. For many applications a substantially vertical orientation of the cylinder axis is preferred because it permits in accordance with a preferred modification of the invention complete submersion of the cylinder in the treating liquid requiring at the same time a minimum amount or volume of the treating liquid. This modification will be described hereinafter in more detail.

Figure 1:
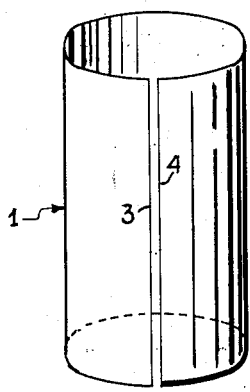
FIG. 1 represents a perspective view of a full cylindrical sheet and FIG. 2 depicts in perspective a partial cylindrical sheet.
Figure 2:
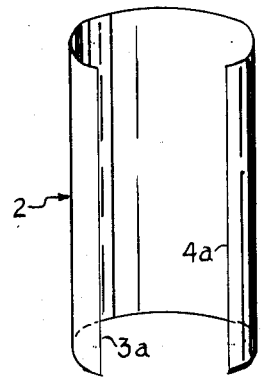

The sheet material having the cylindrical or the substantially cylindrical configuration, as described hereinbefore, will be called in the following discussion "cylindrical sheet." FIG. 1 of the accompanying drawings shows in perspective cylindrical sheet 1 wherein vicinal edges 3 and 4 nearly touch each other. This sheet thus forms a substantially full or complete cylinder. FIG. 2 shows in perspective cylindrical sheet 2 wherein vicinal edges 3a and 4a are also located in the cylindrical plane but are separated by a considerable gap. This sheet thus is a partial cylinder covering only part of the cylindrical plane.

Figure 3:
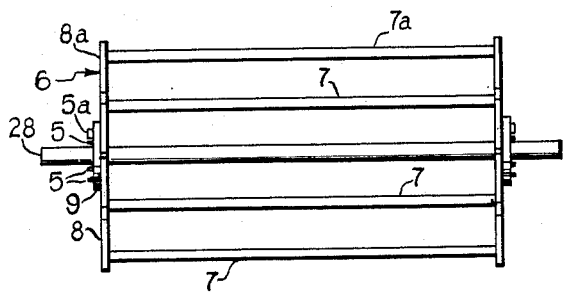
FIG. 3 is a side elevation and FIG. 4 a front elevation of a star-shaped support which is adapted to receive and hold the cylindrical sheet of FIGURES 1 and 2.
Figure 4:
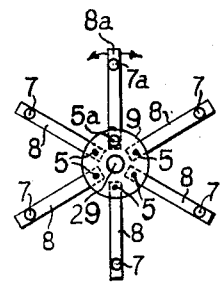

In the operation of the process of the invention the cylindrical sheet may be supported by any suitable means which will be called hereinafter "cylindrical support." The support may be a star-shaped cylindrical structure as shown in FIGURES 3 and 4 of the drawings. FIG. 3 is a side elevational view and FIG. 4 a front elevational view (in the direction of the rotational axis) of the horizontally posiitoned star-shaped cylindrical support 6. The support has a rotational axis and axle 28 coinciding therewith, six bars 7 and 7a surrounding the axle in parallel arrangement to each other and to the central axle. The bars are held by supporting members 8 and 8a respectively which are fixedly fastened to discs 9 by help of bolts 5. At least one of the bars, in FIGURES 3 and 4, bar 7a, with its supports 8a, is designed so that it can be temporariy loosened and pivoted around screws 5a in either direction and reset, by fastening screws 5a, in any desired position between the neighbouring bars 7.

Figure 5:
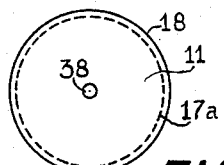
FIG. 5 is a plan view of the top and FIG. 6 is a side elevation of a drum-type closed support for the cylindrical sheet of the invention.
Figure 6:
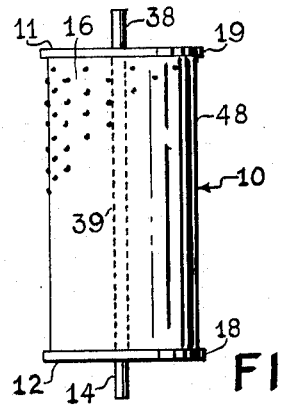

Another modification of the cylindrical support comprises the drum-like or other cylindricaliy shaped structures, which may or may not be open on one or both cylindrical ends. However, it is preferred in accordance with the invention, to employ a closed drum-like cylindrical structure as the supporting means for the cylindrical sheet. Both circular ends of this drum-like structure are closed such that the treating liquid has no access to the interior or inside of the drum. The closed drum of this type, which will be called hereinafter "drum-type support" is shown in FIGURES 5 and 6 of the accompanying drawings. FIG. 5 is a plan view of the top and FIG. 6 is a side elevational view of drum-type support 10. This support comprises the cylindrical wall 48 and the circular top and bottom wall sections 11 and 12 which are joined to the edges of cylindrical wall 48 to form a closed structure. Axle 39 extends through the center of top and bottom sections 11 and 12 and through the entire length of the cylinder, coinciding with its rotational axis. Axle stump 38 extends, outside the cylinder, upwards and axle stump 14 correspondingly downwards both in the direction of and coinciding with the rotational axis of the cylinder. Both circular ends of the cylindrical wall 48 are provided with rims 18 and 19 respectively. The outer convex surface of the cylindrical wall of the drum-type support may be smooth or it may be provided with a multiplicity of protrusions such as raised dots or welts. Pattern 16 of raised dots is shown in the upper left hand corner of the cylindrical wall in FIG. 6. In the alternative one may employ a pattern of indentations or the like. These surface modifications of the cylindrical wall of the drum-type support are intended to permit access of the treating liquid to the back side or concave side of the cylindrical sheet contained thereon, if this is desired.

Generally, it is desirable that the closed drum-type support is made heavy enough to sink in water and particularly in the treating liquids of the highest density with which it might be used. Advantageously, its specific weight should be substantially higher than 1 g./ccm. and preferably at least 1.5 g./ccm. and sometimes even higher than 2 g./cm. in order to sink and remain submerged in concentrated salt solutions, particularly in the concentrated fixing baths which may be used in some processes. The required weight of the support may be supplied by the use of heavy metals as construction materials and/or by the inclusion of extra solid or liquid ballast in the hollow interior of the closed cylinder, e.g. of water, or iron or lead weights. If the weighting of the drum-type support is not desired, it may be pressed into the liquid and held in its submerged position by the application of a downward pressure. This may be accomplished by temporarily connecting some part of the support with the wall or bottom of the vessel wherein the treating liquid is contained.

It need not be mentioned that it is generally preferred that the sheet material is bent onto its support and especially onto the drum-type support in such manner that the photographically active layer or layers of the sheet material form the convex outside of the cylindrical sheet. This precaution insures that the treating liquid has free access to all parts of the area to be treated, when the cylindrical sheet is immersed or contacted with the treating liquid. Thus an even, uniform treatment of the whole area of the active layer or layers is achieved without the danger of local undertreatment and the resultant faults in the final negative or positive materials. Whether or not preference is given to the flat smooth drum-type support or to the corrugated or dotted modification of the drum depends in part on the nature of the materials and processes used.

The foregoing explanations suggest that photographic materials having one or more active or reactive layers on one side of the sheet only are usually more conveniently processed by the process and in the apparatus of the invention than those materials which have such layers on both sides. However, the dotted or corrugated version of the drum is suitable to sometimes permit trouble-free treatment of the latter kind of materials, particularly if the treatment of the layer contained toward the support is not too critical as is the case, for instance, when a layer of dye is to be leached out. The treating liquid usually penetrates into the portions of the layer which are covered by the tiny supporting dots and readily remove the substances and compounds by diffusion and leaching.

The cylindrical sheet may be fastened to the supporting structure in any suitable manner. Small hooks or clamps may be fastened to the two vicinal edges of the cylindrical sheet and then slipped over the bars 7 and 7a of the star-shaped support 6 of FIGURE 3 and 4. In the alternative hooks or clamps may be provided on one of the bars 7 and on pivotable bar 7a and fastened to the vicinal edges of the cylindrical sheet after it has been placed on the support. Moving bar 7a away from the edge of the cylindrical sheet to which it is fastened will tighten the cylindrical sheet and lay it close to the bars all around the supporting member. Arresting the bar in this position will safely hold the cylindrical sheet in the tight position and prevent the hooks or clamps from loosening or falling out. In removing the cylindrical sheet after completion of the desired treatment the reverse steps are applied, viz. the bar 7a is loosened, pivoted around its support in the direction toward the cylindrical sheet material which it holds and the hooks or clamps may be readily removed to release the sheet.

Though this method of fastening the cylindrical sheet to its support may be applied in suitably modified form to the drum-type support 10 of FIGURES 5 and 6, a different method of fastening is preferred in this modification of the support. Pressure sensitive tapes which are adhesive on both sides may be applied to the concave back side of the material in the area of the vicinal edges 3 and 4 (or 3a and 4a) of the cylindrical sheet, if the active layer or layers to be treated in the processing liquids are contained merely on the convex side. The underside of the adhesive strips (which adhere to the back of the sheet material) may then be fastened to the drum-type support by the application of slight pressure over the edges of the cylindrical sheet above the location of the adhesive strips. After completion of the treatment the cylindrical sheet material can be readily removed by peeling it off the drum surface. With this modification there is no need for a subsequent removal of the adhesive tape from the back of the sheet material if the tape is desired to provide the adhesive for the later mounting of the finished print or other product on suitable background material.

In the alternative two adhesive tapes which are provided with an adhesive layer on only one side can be applied (with the adhesive side down toward the sheet) to the face of the sheet along the vicinal edges of the cylindrical sheet such that narrow sections of the adhesive strips extend over the unused edge of the sheet material. The protruding portions of the adhesive tape can then be fastened to the drum surface by the application of slight pressure. After completion of the treatment the edges of the sheet material with the tape adhering thereto may be simply cut off. It need not be mentioned that the adhesive tape should be inert to the treating liquids used and vice versa.

A more generally applicable and more satisfactory method and mode of fastening the cylindrical sheet to the drum-type support avoids the use of adhesive tape altogether. In this preferred modification of fastening the cylindrical sheet to the support and particularly to the drum-type support spring loaded clips or clamps are employed. An embodiment of this modification is shown in FIGURES 7 to 11 of the accompanying drawings. FIG. 7 is a sectional view of a portion of a drum-type support which was cut perpendicularly to the central axis. A spring loaded clamp 25 is fixedly provided, recessed in transverse indentation 26 of the cylindrical wall 48b. Indentation 26 extends over the entire length of the cylindrical wall 48b in parallel alignment with the central axis of the cylinder. It terminates at each end at the inside of the circular faces of the drum and of the rims 18b and 19b, respectively (the latter is not shown). Clamp 25 which extends over nearly all the length of the indentation comprises supporting member 23 and pivotally secured to the upper end of the support flat clip 25 which is held depressed onto the convex side of cylindrical wall 48b by spring 21. The clamp may be opened to receive or release the edge of a sheet of photographic material by depressing lever member 22. A second spring loaded clamp may be provided in another recess or indentation of the drum-type support in similar manner, or it may be removably fastened to the drum-type support in such manner that it can be displaced or moved around the cylindrical wall and locked in place in any desired position around the periphery of the cylindrical support.

A preferred embodiment of the removable clamp and means for fastening it on the support is shown in FIG. 8 of the accompanying drawings. FIG. 8 is a coaxial section of a portion of a drum-type support and of the clamp contained thereon. Rims 35 encircle the edges formed by cylindrical wall 48a and circular end sections 11a and 12a respectively, of the closed drum-type support. Clamp 40 is fastened on band 27. Both ends of band 27 are bent downwards to form the vertical elastic and curved sections 36 which by virtue of their elasticity press against the outer periphery of rims 35 and against circular walls 11a and 12a thus holding, by frictional forces band 27 and clamp 40 in a fixed position when it is slipped over rims 35 of the drum-type support.

The band 27 with its elastic angled extensions and the sheet holding clamp thereon may readily be removed and reinserted at any desired point around the periphery of the cylindrical support. Clamp 40 is shown in FIG. 8 located underneath band 27. Sometimes it will be desirable to locate the clamp on the upper side of band 27.

Elastic, vertical extensions 36 of band 27 are angled downwards by an angle which is approximately 90°. FIG. 9 is an elevational side view of extension 36a which has in its center a vertical indentation or welt 37 and a corresponding narrow, elongated protrusion on the backside of extension 36a facing rim 35 when band 27 is inserted, and pointing radially toward the axis of the drum-type support. This is shown in more detail in FIG. 10 which is an elevational view of a portion of the outside of circular wall 12b and rim 35a of another modification of the closed drum-type support. Rim 35a has been provided with indentations 34 which are of a size suitable to accommodate the protrusion underlying welt 37a and which are arranged radially around the rim in narrow, even spacing over the entire radial width of the rim. Band 27 with clamp 40 joined thereon is shown inserted onto the cylindrical support, elastic vertical extensions 36a engaging over rim 35a and the protrusion opposite welt 37a lying in one of the indentations 34. This modification of the drum-type support has the added advantage that adjustable clamp 40 cannot be accidentally displaced in the direction of the periphery during the treatment of the cylindrical sheet or during handling of the support.

Clamp 40 which may also be employed instead of the fixed clamp 25 of FIG. 7 is shown in an enlarged sectional side view in FIG. 11. The clamp comprises as the principal components base 45, spring 42 and the upper holding member 41. The base forms in section a trapezoid with an extension of the base of the trapezoid to the left, the extension forming the lower claw 46. The upper member 41 is pivotally mounted in the right upper corner of the trapezoid, together with spring 42, and follows the contours of the upper horizontal side and the left slanted side of the trapezoid and finally of the lower claw 46 thus forming upper claw 44 which is normally pressed against lower claw 46 by the action of spring 42. The clamp can readily be opened by depressing lever 47 which is formed by an extension of the upper holding member 41 to the right. The left, slanted side of the trapezoid forms stop 43 which prevents the vicinal edge of the cylindrical sheet material inserted therein from sliding into the clamp by more than a predetermined narrow distance.

The strip of material along the vicinal edge which is permitted to be covered by the upper clamp member or claw is usually kept as narrow as possible, the only criterion being that a firm, secure grip is assured. Thus only a minimal portion of the sheet material, usually no more than about one millimeter to several millimeters wide, is covered and thus protected from the action of the treating liquid during processing. The narrow, untreated strips may be removed from the finished sheet, for instance by cutting them off. The removal of any part of the sheet after completion of the treatment may, however, be unnecessary, if one or both claws of each clamp or clip are provided on their sides facing each other with small protrusions and especially with a row or pattern of dot-like protrusions which make contact with the surface of the clamped-in vicinal edges of the cylindrical sheet. With sufficiently high pressure exerted by the springs or similar means, the cylindrical sheet will be securely held in place, while the minute areas covered by the protrusions will be reached by the treating liquids, by penetration or diffusion: If the usual white unexposed edges are provided all around the sheet material, the contact points should fall into this narrow strip. Any undertreatment of the contact points would generally be of no detriment to the finished product. If in exceptional cases treatment faults should become apparent during extended storage the unexposed edge may simply be cut off all around with no damage to the useful picture area.

Any other type of clip or clamp may be employed, preferably with suitable adjustments having been made to provide for the special requirements of the process and apparatus of the present invention. One or more clips or clamps may be used to hold each of the vicinal edges of the cylindrical sheet. They may be narrow clips extending over a width of an inch or less in the direction of the length axis of the cylinder or they may be of the wider variety, extending over a substantial portion of the cylinder axis and preferably over nearly the whole width of the cylindrical support. The clips or clamps may be fixedly attached at such positions around the periphery of the drum that they accommodate the maximum size of sheet material for which the cylindrical support is designed. However, in order to render the apparatus flexible and capable of accommodating any desired size of sheet material which is smaller than the maximum size at least one or one set of the clips or clamps should be removable and adjustable so that it can be moved around at least a portion of the periphery of the cylindrical support, as has been described hereinbefore. The clips or clamps may also be slidably mounted on one or more circular guides provided around one or both ends of the cylindrical support and other provision for temporarily arresting or locking the movable clips or clamps in any desired position around the periphery may be included in the design.

As stated hereinbefore, it is preferred to employ in the operation of the process of the invention the cylindrical support, and particularly the closed drum-type support which uses one of the stationary clamps recessed in the cylindrical plane or wall and one or one set of the clamps or clips of the removable or adjustable type.

The sheet material may be applied and fastened to the drum-type support by inserting and securing one vicinal edge of it in fixed clamp 25. The sheet is then given its cylindrical configuration by bending it downwards against and around the cylindrical support. Adjustable clamp 40 is then moved along the periphery of the drum to a distance from the fixed clamp which permits insertion of the opposite edge of the sheet in the opened clamp 40 which is thereafter closed and moved away from the sheet material to lay it close to the surface of the cylindrical supporting wall. In the alternative clamp 40 may be removed and clamped onto the free vicinal edge of the cylindrical sheet and fastened to the cylindrical support by snapping the vertical elastic extensions 36 of the band 27 over rims 35.

The fixedly joined or attached clip or clamp may be omitted, if in its stead a narrower slot, extending over all or nearly all of the width of the drum-type support, is provided in the cylindrical surface of the drum. The slot is located parallel to the cylindrical length axis in or near the surface of the cylindrical plane of the drum. One of the vicinal edges of the cylindrical sheet is slipped into the slot. A stop provided inside the slot prevents the sheet material from sliding in by more than a predetermined amount. Preferably the depth of penetration is kept very small for instance one half up to a few millimeters. The slot is closed to the interior of the drum in the case of the closed type drum to prevent entrance of the treating liquid into the interior of the drum.

In another modification of the drum-type support ring-like slots are provided at or near both outer circular edges of the drum all around the periphery of the drum such that the circular edges of the cylindrical sheet are slipped into the circular slots, holding the sheet material securely in place during the treatment, thus eliminating the need for clips or clamps. The insertion of the cylindrical sheet in the circular slots is facilitated and varying sizes of sheet material can be processed on one and the same support if at least one of the circular slot arrangements is mounted slideably in the direction of the cylinder axis wtih a provision to lock it in place in any desired position after the insertion of the cylindrical sheet. Any other desired arrangement to hold the cylindrical sheet securely in place during the treatment in the processing liquids may be used.

The drum-type support and particularly the closed drum-type support mentioned hereinbefore can be used with particular advantage in a modification of the invention which employs as the container holding the treating liquid or liquids a cylindrical or partially cylindrical tank or vessel. The cylindrical vessel is preferably used in an upright position such that the cylinder axis is in a vertical orientation or at least substantially in this position. Its inside diameter is advantageously only slightly larger than the diameter of the cylindrical sheet or its support which is to be submerged in the cylindrical vessel. The diameter of the inner circular wall of the vessel may be up to one third or more larger than that of the cylindrical support and is preferably exceeding it by one thirtieth to one tenth. The height of the vertical cylindrical wall of the vessel is exceeding that of the cylindrical support, preferably by a substantial amount, which may range from a small fraction to one twentieth and up to one half or more of the total height of the cylindrical support. This type of vessel will be called hereinafter the "upright vessel."

One modification thereof with a closed drum-type support inserted therein in operating position is shown in a plan view (top) in FIG. 12 and in vertical section taken along lines 13 of FIG. 12 in FIG. 13 of the accompanying drawings. The upright vessel 50 comprises as the substantial elements circular bottom 51 and extending rectangularly upwards from the edge of the bottom vertical cylindrical wall 52.

If the closed type drum is used in combination with the upright cylindrical vessel and if the relative dimensions are falling within the ranges given hereinbefore, only a relatively small amount of treating liquid is required to fill the narrow space left between the circular wall 52 of the cylindrical vessel and the cylindrical wall 43c of the drum-type support and the cylindrical sheet of photographic material contained thereon (not shown). Small additional amounts of the treating liquid may be required to fill the bottom portion of the vessel between the bottom 51 of the vessel and the lower circular wall 12b of the support if the drum-type support is not completely lowered to the bottom of the vessel. An additional amount of the treating liquid may be present in the portion of the vessel above the upper circular wall 11b of the support, to assure complete submersion of the cylindrical sheet and of its support as the case may be. Only a fraction of the treating liquid, normally required in the conventional tank or tray development of the same size sheets, is required with the expedient of this invention, of employing the combination of the cylindrical sheet with the closed drum-type carrier and the upright cylindrical vessel. The saving in the amount of treating liquid required for each individual treatment of the photographic sheet material is of particular importance if only one or a small number of sheets are to be treated at one time or in one session with processing liquids which cannot readily be stored without being subject to deterioration or other undesirable changes.

In its application to the color processing techniques the cylindrical vessel is thus with advantage designed and dimensioned such that it accommodates an amount of the treating liquid (when the closed drum is inserted) which will safely process only the small number of sheets of the color material which is usually processed in the short sessions, say four, five or six sheets of the maximum size for which the apparatus is designed. If more than this predetermined number of sheets is to be processed, the liquid may be simply discarded and fresh liquid is placed into the vessel, or it may be replenished by the addition of the chemicals provided for this purpose. In multistep processes each vessel may be dimensioned for the particular effectiveness and treating capacity of the liquid for which it is designed, so that after each session or after the treatment of the predetermined number of sheets all the solutions or processing liquids used in the particular process may be discarded. This expedient has the additional advantage—aside from the savings possible by the complete exhaustion of each of the processing liquids to their safe limits—that always fresh processing liquids are used. This is an important factor in achieving absolute reproducibility of the results, particularly in the complex and sensitive color developing processes. It removes the need for the storage of partially used liquids in separate containers, or the risk of contamination and spoilage prevailing when the used portions of the treating liquids are poured back into the containers containing the supply of the fresh solutions. Thus the above described arrangement and steps of the present invention contribute considerably to the simplification of complex, multistep photographic processes and particularly also of the multistep color developing methods presently in use.

The following example demonstrates the requirements of processing liquid in a practical application of the cylindrical upright vessel in combination with the closed drum support containing the cylindrical sheet. The data are given in approximation and rounded figures and apply to a vessel and support accommodating an 8 x 10-inch sheet. Specifically, the data have been applied to the first developing step in the Kodak Ektacolor Paper printing process. This process is described in detail in the Kodak Publication No. E–66 (Printing Color Negatives), first edition, 1958. According to this publication three and one half gallons of the first developing solution are capable of developing 90 sheets of the 8 x 10-inch size without the use of replenishers. Replenishment extends the capacity to 390 sheets of the same size. Correspondingly, approximately 150 ccm. of the solution are required for the development of one sheet of this size without the use of replenishers. The cylindrical wall of the closed drum-type support for the cylindrical sheet has a diameter of approximately 8.5 cm. and a length of approximately 20 cm. The upright cylindrical vessel has an inner diameter of approximately 11 cm. The developing solution stands, with the drum inserted in operating position, approximately 22 cm. high, leaving about one cm. each at the bottom and at the top beyond the lower and upper end of the drum. Approximately 930 ccm. of the liquid are required to fill the vessel (with the drum and cylindrical sheet contained therein) to the indicated height. This amount of liquid permits the development of approximately 6 sheets of the 8 x 10-inch size without replenishment. This number can be increased up to approximately 25 sheets if replenisher is added in the usual manner.

The spacing between the inner wall of the vessel and the cylindrical wall of the drum may be kept narrower, if it is so desired, in order to reduce the required amount of developer even further. In the device having the approximate dimensions given hereinbefore, five to six 8 x 10-inch sheets can safely be developed in the first developing step of the said color process with one filling of fresh solution and without replenishment. As regards other processes or steps in a series of treating steps, the space provided between the cylindrical sheet and the inside wall surface of the upright vessel may be adjusted to provide the proper volume correlated to the capacity of the solution or liquid in question. Depending on the circumstance and the intended use, the vessel and the support may be designed and proportioned such that the space is as narrow as a few millimeters or it may be up to several centimeters if larger numbers of sheets are to be processed in one session without renewal or replenishment of the treating solutions.

Another way of providing varying amounts of treating liquid commensurate with the number of sheets which one desires to develop in one session may also be used. In accordance therewith the free space between the inside wall of the vessel and the convex outside of the cylindrical wall of the closed drum-type support is kept as narrow as feasible by suitable design of vessel and support and the varying needs of treating liquid are provided by filling the vessel to various (indicated and marked) levels. In this modification the height of the vessel is advantageously dimensioned somewhat more generously, exceeding the height of the cylindrical drum by one third up to one half or more.

The reactive layers of most photographic materials are sensitive to scratching and other mechanical action when they are swollen by aqueous processing solutions. It is therefore important that the surface of the cylindrical sheet is kept out of contact with the walls of the upright vessel while it is treated therein. This makes it desirable that the cylindrical support is securely supported and centered in the vessel preferably rotatably, for instance, by localizing and supporting the lower and the upper axle stumps of the cylindrical support in suitably located bearings. An embodiment of upper and lower bearings is shown in FIGURES 12 and 13 of the drawings. The lower bearing 54 is located in the center of the circular bottom 51 of the upright vessel and is part of and contained in horizontal bar 53 which is joined to bottom 51 of the vessel and which extends diametrically across the circular bottom from wall to wall of the vessel. The cylindrical bearing 54 is slightly larger in diameter than the cylindrical end of axle stump 14a of the cylindrical support and is designed to rotatably receive the end of the axle stump.

Another preferred modification of the lower bearing is shown in FIG. 15 which depicts a vertical section taken along the length axis of the upright vessel 55, along lines 15 of FIG. 14. Vessel 55 comprises circular bottom 51a and cylindrical wall 52a, with a closed drum-type support inserted therein in operating position. Bottom 51a of the vessel has in its center a cup-shaped cylindrical indentation 54a with vertical cylindrical wall 56 extending above and below bottom 51a. The upper portion of the cylindrical indentation 54a which is surrounded by circular wall 56 has been widened to an inverted frusto-conical indenture which together with the lower cylindrical bore has the appearance, in cross section, of a funnel. This design of the lower bearing facilitates the insertion of the lower axle stump 14b, which upon insertion and upon contact with the conical wall section 57 readily slides into the cylindrical indentation or bearing 54a. The latter is slightly larger than the cylindrical end of axle stump 14b to permit ready rotation of the inserted axle stump 14b and of the closed drum-type support to which axle stump 14b is fixedly connected (in the center of the lower circular wall 12a of the closed cylindrical support). The photographic treating liquid contained in the vessel and thus also in the lower bearing acts as lubricant thus greatly facilitating any desired rotational movement of the drum-type support relative to the vessel wherein it is contained. The cylindrical wall 48a of the drum of this modification of the support is provided with rims 35a to accommodate the removable clamp described hereinbefore. Cylindrical wall 52a of vessel 55 is extended downwards below the bottom 51a and the lower bearing. The extension 58 of the wall 52a forms a ring which serves as the support for the vessel 55. The ring 58 has several perforations (not shown) to permit access and flow of liquid, surrounding the vessel, also underneath of the bottom of the vessel. The upper axle stump or shaft of the cylindrical support may be held in place and centered by a support and bearing arrangement as is shown in FIGURES 12 and 13. This arrangement comprises the flat horizontal member 61 which is flanged downwards on both ends to form vertical flanges 65. Midway between the flanges 65 an aperture 62 is provided which is dimensioned to rotatably receive section 63 of the upper axle stump or shaft, thus forming the upper bearing. The aperture 62 is narrower than the lower section 67 of the axle stump which is directly and fixedly connected to the center of the upper circular wall 11b of the drum-type support. The seat thus formed at the intersection of wider section 67 and narrower section 63 of the upper axle stump serves to prevent that supporting member 61 moves beyond the predetermined position toward the drum-type support while it is outside of the upright vessel.

The flanges 65 of the supporting member 61 rest, when the drum-type support is inserted in the vessel 50 as is shown in FIGURES 12 and 13, in pockets 66 which are provided on diametrically opposite portions of the upper cylindrical wall 52 near the top edge of the upright vessel. Pockets 66 are open at the top to permit ready insertion and removal of the ends of supporting member 61 with the flanges 65. The lower ends of the flanges 65 rest on the bottom portion of pockets 66. This arrangement assures that the upper supporting member 61 is securely localized in relation to the vessel 50 without impeding the ready insertion and removal of the drum-type support with the upper supporting and centering means including the upper bearing attached thereto.

Another modification of the upper centering and bearing arrangement is shown in FIGURES 14 and 15. Narrow, horizontal supporting member 84 is, turned on its narrow edge, inserted in slots 87 which are provided on diametrically opposite portions of the uppermost part of the vertical cylindrical wall 52a of vessel 55. The slots are open to the top to permit ready insertion and removal of the centering member. Triangular stops 86 are provided close to the ends of member 84 in a distance to fit close to the inside of cylindrical wall 52a of vessel 55. Midway between its ends member 84 is provided with a cylindrical bulge 85 with bore 62a in its center. As before, aperture 62a is wide enough to rotatably receive section 63a of the upper axle stump of the drum-type support but narrow enough to rest on the seat formed by the upper edge of the lower, wider section 67a of the axle stump. As can readily be seen also this centering and bearing arrangement is contained and attached to the drum-type support and does not interfere with the insertion and removal of the drum-type support into and from the vessel 55 and does permit rotation of the drum-type support relative to the vessel and assures that the drum is centered in the vessel 55 at all times.

The upper and lower centering and bearing arrangement have hereinbefore been demonstrated in combination with the drum-type support and particularly with the closed drum-type support. They can likewise be employed with equal benefit with any other type of cylindrical support and particularly also with the star-shaped support described hereinbefore. Each of the described upper and lower centering and bearing arrangements may be used in combination with other arrangements and any desired modification may be made therein.

In an alternative construction of the lower bearing and centering means an axle stump may protrude vertically upwards from the center of the circular bottom of the upright vessel engaging rotatably in an indenture or in a cylindrical bore provided in or at the lower circular face of the drum-type or other cylindrical support to be inserted in the vessel.

The upper end of the axle or the upper axle stump of the cylindrical support may be provided with a lever which is fixedly and preferably removably mounted thereto. Actuation of the lever by hand or by connection to a rotating or reciprocating power source gives the cylindrical support and the cylindrical sheet mounted thereon a continuous or a reciprocating rotational motion within the treating liquid contained in the upright vessel. The rotation may be unidirectional and if desired continuous or intermittent. An intermittent, unidirectional motion may be brought about, for instance, by the provision of a gear, sprocket wheel or of special modifications of these elements which are mounted or inserted onto the upper end of the axle or axle stump, respectively, and which may be driven by belts or chains and similar means passing by the said driving means.

Particularly suited driving means are shown in FIGURES 12 and 13 of the drawings. The modified sprocket wheel comprises four rods or sprockets 71, 71a, 71b and 71c which are radially mounted in the center wheel base 68 at right angles to each other. Wheel base 68 has in its center a rectangular aperture which fits slidably over the rectangular upper section 64 of the upper axle stump of the drum-type support. Endless belt 75, of which only a section is shown in FIG. 12 travels in the direction indicated by the arrow closely underneath the bars or sprockets. Protrusions 76 and 77 are mounted on the upper side of the belt extending in between the rods or sprockets. As the belt travels in the indicated direction protrusion 76 contacting rod or sprocket 71 pushes it forwards and causes the modified sprocket wheel to which it belongs and the drum-type support to rotate around their length axis. When the protrusion has travelled past the point where it makes contact with the rod or sprocket 71 the rotational motion temporarily stops. Protrusion 77, next on the belt, then engages by contacting rod or sprocket 71a, thus continuing the rotational motion of the drum-type support and the cylindrical sheet contained thereon, until it loses contact and the next protrusion engages in the next rod or sprocket and so forth. Depending on the spacing of the protrusions on the belt in relation to the length of the individual rods or sprockets the rotational motion will be continuous or nearly so, or it will be intermittent, for instance, if only a few protrusions are provided on the belt in relatively wide spacing. Generally, the spacing of the protrusions need not be less than the distance from the tip of the rod or sprocket to that of the next. The spacing of the protrusions may be uniform from one protrusion to the next or it may be varying depending on the desired effect. The sector by which the cylindrical support is rotated by each contact with a protrusion can be readily controlled by varying the length of the rods or sprockets correspondingly, shorter length giving a smaller section of rotation and vice versa. The rate of travel of each point of the periphery of the cylindrical support and of the cylindrical sheet contained thereon may also be adjusted by controlling or varying the rate of travel of the belt. The combination of these variables, number of rods or sprockets in the sprocket wheel, length of the individual rod or sprocket, number and spacing of the protrusions on the belt and rate of travel of the belt permit absolute control of the relative movement of the surface of the cylindrical sheet material in the treating liquid to create for each material and for each treating solution the most favorable treating conditions.

An embodiment of the above-mentioned star-shaped gear is depicted in a top plan view in FIG. 14 and in vertical section in FIG. 15. The latter is taken along lines 15 of FIG. 14. Gear 80 comprises six teeth 82, evenly spaced and arranged around the circular central section of the gear. The point of each of the teeth 82 is connected with the point of each of the neighbouring teeth by the concave curved sections 83 thus producing the characteristic star-shaped appearance of the gear.

The center of the gear is provided with a rectangular aperture which slidably fits over the upper, rectangular section 64a of the upper axle stump or shaft of the drum-type support. Gear 80 has, at its underside, rim 88 which encircles the central, circular portion of the gear concentrically. When the gear is attached to the cylindrical support and both are inserted in operating position in the upright vessel 55, circular rim 88 overlaps and surrounds the upper portion of the cylindrical wall 52a leaving a gap or space between them as not to interfere with the rotation of the gear and the cylindrical support to which it is connected or attached. The rim serves to exclude light from the inside of the vessel thus protecting the photographic material being treated therein from undesired stray-light.

Belt 75a which is provided with protrusions on its upper side is travelling underneath the star-shaped gear, out of contact, however, in close proximity to the gear to permit contact of the protrusions 78 with the curved sections 83 of the gear 80. As described hereinbefore, the travelling protrusions push the gear teeth forward and cause any desired continuous or intermittent unidirectional rotational movement of the cylindrical support connected to the gear. The stroke or sector of each component of the motion and the relative rate of travel of the surface of the cylinder wall of the support can be readily controlled by proportional dimensioning of the radius of the individual gear teeth, the number of the teeth on any one gear, the number and the spacing of the protrusions on the belt and the rate of travel of the belt. In order to reduce friction between the travelling protrusions and the star-shaped gear roller 79 is mounted rotatably on or around protrusion 78.

Continuous unidirectional motion of the cylindrical support around its rotational axis may also be brought about by the provision of a regular gear, sprocket wheel, friction gear or similar means on the upper end of the axle or on the upper axle stump respectively which may engage in positively driven gear, geared belt, chain or similar driving means.

All these methods cause the movement of the photographic cylindrical sheet relative to the stationary vessel and treating liquid contained therein, which is in most instances the most desirable manner for the production of uniform, reproducible results. As will be shown hereinafter, the process and apparatus of the invention may also be modified in such manner that the cylindrical sheet of photographic material is kept stationary while the treating liquid and/or the vessel containing it is moved relative to the stationary cylindrical sheet.

The simple, automatic actuation of the cylindrical sheet relative to the treating liquid or of the treating liquid relative to the sheet relieves the operator from paying any attention to this part of the process. Furthermore, by proper design and proportioning of the driving and driven means a predetermined rate of relative movement is achieved which will be uniform from operation to operation. Thus the expedient of providing automatic actuation, as described hereinbefore, does not only simplify the processing of the photographic sheet material but provides also the utmost in reproducibility from sheet to sheet and from day to day, eliminating a source of inconsistency which is always present in the uncontrolled tray method.

If the upright vessel has an inner diameter which exceeds that of the outer periphery of the cylindrical sheet only slightly, there is the danger that upon insertion or removal of the cylindrical sheet into or from the vessel the soft, swollen surface of the sheet material is scratched or otherwise damaged by contact with the parts of the cylindrical wall of the vessel, particularly with the upper edge of the vessel. This danger is greatly reduced by the presence of one or two rims on one or both ends of the cylindrical support as has been shown, for instance, in FIG. 6 (rims 18 and 19), in FIG. 7 (rim 18b), in FIG. 8 (rim 35), in FIGURES 12 and 13 (rims 18a and 19a) and in FIGURES 14 and 15 (rims 35a). Generally, the rims have a slightly larger outer diameter than the cylindrical sheet, which is, however, slightly smaller than the inside diameter of the cylindrical wall of the upright vessel, if such is used. Another factor in reducing the danger of damaging the surface of the cylindrical sheet is found in the utilization of the outer edge of the removable clamp or means used to fasten the clamp or clips to the cylindrical support, if the clamp or clips are contained recessed between the rims on the underside of the holding means. So for instance, may the upper edge of clamp 40 in FIG. 8, or in the alternative, if the clamp 40 is contained on the underside of band 27, the outer side of band 27, be used as a guide for sliding the cylindrical support over the upper edge of the upright vessel. At the same time the diametrically opposite portion of the lower rim may serve as a guide to slide the support down or up along the opposite side of the inside wall of the vessel. Thus contact of the cylindrical sheet, which is recessed between the rims, with the wall or any part of the vessel is positively prevented and virtually impossible.

Heretofore, the cylindrical upright vessel has been described, which permits the utmost economy in the consumption of processing liquids. This modification of the invention requires also the minimum of working area or floor space for a given size of the sheet material. Another modification of the container for the treating liquid may, in accordance with the present invention, be employed in conjunction with the cylindrical sheet if economy with regard to the amounts of processing liquid required and working space are not of such great importance. This modification of the container comprises substantially one half of a cylinder, cut along the cylinder axis and closed at both ends by two facing walls forming half circles and many modifications derived therefrom. This trough-like version of the container is oriented such that the cylinder axis is lying in a horizontal or substantially horizontal position. Similarly as in the upright cylindrical version of the vessel, the diameter of the half cylinder is at least slightly larger than the diameter of the cylindrical sheet or its cylindrical support which is to be accommodated therein. The axis of the cylindrical sheet, when it is contained in the trough is likewise in horizontal position and preferably falls together with the cylinder axis of the half cylinder. It is apparent from the foregoing that the cylindrical sheet is only partially submerged in the treating liquid when contained in the short form of the trough, in operating position. Rotation of the cylindrical sheet in the trough around its cylinder axis brings successive portions of the cylindrical sheet in contact with the treating liquid contained in the tray.

In order to avoid splashing of the treating liquid or, to enable one to fill the trough with the treating liquid to a level which permits complete submersion of the cylindrical sheet, another version of the horizontal trough-like container is used with advantage which trough is primarily characterized by a vertical upward extension of its confining walls.

This modification of the trough-like container, which will be called hereinafter "horizontal trough" is shown in FIGURES 16 to 18 of the accompanying drawings. FIG. 16 is a sectional view of the horizontal trough, with a cylindrical drum-type support inserted, cut vertically in the plane of the horizontal length axis. FIG. 17 is a transverse vertical section of the trough of FIG. 16 taken along lines 17. Trough 90 comprises the cylindrical wall section 91 which forms exactly one half of a cylinder with its open coaxial plane being at the top. Each side of the cylindrical wall (parallel to the length axis) is extended vertically upwards to form wall sections 92. Each wall section 92 is flanged at the top to form horizontal flanges 93. Both circular ends of the extended half-cylinder are joined with side walls 95 which extend to the height of flanges 93 and which are likewise flanged to form flanges 94. The closed trough formed by these wall sections has, viewed from the top, a rectangular outline with a rounded, cylindrical bottom of a width equalling the diameter of the lower half-cylinder. The flanges 93 and 94 serve as the supports for suspending the trough in suitable supporting means (not shown).

Inside the trough, supporting members 96 with vertical slots 97 at their upper end are joined to the wall sections 95 such that the lower end of each of slots 97 nearly coincides with the axis of the lower half of the cylinder or with the center of the lower half-circular portions of wall sections 95, respectively. The slots 97 are wide enough to rotatably receive the ends of axle 101 of cylindrical support 100 thus forming a bearing for the cylindrical support wherein the latter may be rotated or rotatably reciprocated with the treating liquid contained in the trough acting as the lubricant. The upper ends of slots 97 may be widened to form a wedge-shaped slot with the bottom portion being slightly wider than the diameter of the ends of axle 101. This modification generally facilitates insertion of the cylindrical support into the bearings (not shown).

Cylindrical support 100, shown in inserted position, is of the closed drum-type, having a plain cylindrical surface with no rims. To the upper portion of the right circular wall of support 100 is joined lever or crank 106 with crank pin 107 contained in its upper end. Lever or crank 106 may be actuated by hand or by connecting crank pin 107 with a reciprocating power source to give the cylindrical support and the cylindrical sheet contained thereon (not shown) a reciprocating rotational motion. The extreme right position of lever or crank 106 is indicated in FIG. 17 by dotted lines. The crank is designated by numeral 106; with crank pin 107'. Two handles 102 and 104 are loosely and rotatably contained on axle 101 of the cylindrical support. They are held in place by discs 108 which are concentrically contained and fastened to axle 101 with a space between them to accommodate the handle 102 and 104, respectively, with sufficient play not to interfere with their rotatability. Both handles 102 and 104 are flanged at the top to form gripping means 103 and 105, respectively, which facilitate the holding of the handles by hand for the insertion and removal of the cylindrical support into and from the horizontal trough. The handles are normally, during operation of the process and apparatus of the invention, leaned against the upper, inner edge of wall section 92 where they do not interfere with the operation.

As can be readily seen, in the just described modification of the horizontal trough the cylindrical support with the cylindrical sheet contained thereon may be completely immersed in the processing solution by filling the trough to the proper level. In either the low or the high form of the horizontal trough any of the cylindrical supports described hereinbefore or any other desired modification thereof may be used with advantage. As in the vertical version of the vessel, the upright vessel, the closed drum-type support will also in the horizontal trough permit operation with considerably smaller amounts of processing liquids than are required with the open drum-type or with the open star-shaped cylindrical support. The ends of the axle or axle stumps of any of the cylindrical supports can be inserted in slots or bearings 97 as has been shown herein before with respect to the closed drum-type support. This arrangement will ensure alignment of the cylindrical sheet, when inserted in operating position in the trough, such that the cylindrical sheet is evenly spaced from the half-cylindrical wall in all places, preventing contact of the soft active layer of the photographic material with any part of the trough. The space between the inside cylindrical wall portion and the surface of the cylindrical sheet may be narrow, from a few millimeters to several centimeters or more, depending on the size of the sheet material to be processed and the amount of treating liquid required or desired in the specific process carried out in the trough. If desired, the support may be made adjustable permitting the cylindrical sheet to be inserted in a lower or higher position than the coaxial, central position described above. Rims, means for fastening the cylindrical sheet to the cylindrical support etc. may be provided as has been described hereinbefore.

It is generally preferred that the cylindrical support, when inserted in the horizontal trough, may be rotated. The rotational motion may be continuous or intermittent, unidirectional or reciprocating, depending on the nature and requirements of the process and materials treated in the trough. Reciprocating, rotational movement of the cylindrical sheet relative to the treating liquid contained in the trough may be created by the provision of a lever or crank at one of the circular faces of the cylindrical support or on its axle or axle stump as has been described hereinbefore.

If a unidirectional rotational motion of the cylindrical sheet is desired in the trough a gear may be provided at one end of the axle or axle stump which by engagement with a positively driven gear or geared belt permits rotation of the cylindrical support and of the cylindrical sheet contained thereon. A modification of the horizontal trough utilizing the gear arrangement is shown in FIG. 18 of the accompanying drawings, which is a vertical section of a portion of the horizontal trough taken along the plane of the central length axis. The trough is formed as before by wall sections 91a, 92a and 95a with upper horizontal flanges 93a and 94a as the supports for the trough. Cylindrical support 100a which is of the closed drum-type is rotatably suspended in slot-like bearing 97a by the ends of its rotational axle 101a. Slot 97a is contained, concentrically with the circular lower portion of wall section 95a, in supporting member 96a. As before, handle 104a with flanged end 105a as the gripping means is loosely and rotatably contained on axle 101a of the cylindrical support. Gear 110 is likewise concentrically contained on axle 101a and is joined to the circular face of the drum-type support 100a. The gear 110 is of a diameter larger than the height of the trough. To accommodate its excessive diameter in the trough the vessel has been provided with bulge 109a all around the half-cylindrical wall 91a and its extensions 92a. Though the gear or similar driving means may have about the same or a smaller diameter than the cylindrical support, certain advantages are associated with a design wherein the gear has a considerably larger diameter as has been shown in FIG. 18. This construction brings the top portion of the gear outside of the tray so that a belt or chain or similar means which pass over the trough may engage and drive the gear and thus rotate or reciprocate the cylindrical support and the cylindrical sheet contained thereon. If a gear 110 of smaller size is used rotational motion of the cylindrical support may be provided by a second positively driven gear which is mounted in a position above said first gear. In order to permit ready removal of the cylindrical support from the trough, the positively driven gear may be designed such that it can be readily swung out of the way or into the engaging position, as the case may be e.g. by the provision of a cross-coupling in its driving axle.

As stated hereinbefore, instead of moving or rotating the cylindrical sheet and the cylindrical support relative to the stationary container the upright vessel or the horizontal trough or other container, with the processing liquid contained therein, may be actuated or moved relative to the cylindrical sheet. The motion of the container may be continuous or intermittent. It may be in a vertical direction or, in the case of the upright cylindrical vessel, rotational around the cylinder axis. The former may be a vertical up and down motion.

Even a relatively short stroke of, for instance, a fraction of an inch or one or two inches will provide sufficient turbulence in the treating liquid to bring continuously new portions of the treating liquid in contact with each area of the photographic sheet material. This is particularly the case when the closed drum-type cylindrical support is used. With the latter, because of its effectiveness, intermittent motion every 20 seconds or so will permit the uniform treatment of sheets of any desired size in the treating liquid, permitting in many cases excellent, flawless results. The clips or clamps attached to the cylindrical support, and particularly the raised type containing the elevated sliding bar, assist in the creation of sufficient turbulence to bring continuously new portions of the treating liquid in contact with the surface of the photographic sheet material.

In general, the method and design of apparatus involving the movement of the cylindrical sheet relative to a stationary treating bath are preferred because they give the possibility of better control and because they require generally simpler and less expensive construction.

In any of the methods described for actuating the cylindrical sheet relative to the treating liquid or vice versa the exchange of chemicals or their deposition or the removal of chemicals from the active layer or layers of the photographic sheet material can be achieved in well controlled manner by adjusting the rate of relative motion to the specific requirements of the process and materials used in each instance. Once the optimum rate of movement or motion has been found or established in a given apparatus and process it can be readily maintained in absolutely the same level and effectiveness and complete reproducibility of the process and consistency of the results are assured.

If in accordance with the invention more than one vessel or trough, with the cylindrical sheets inserted therein, is connected to a single power source, each container may still have its individual, optimum rate of relative motion or movement depending on the requirements of the particular processing step carried out therein. This may be accomplished by proper dimensioning and adjustment of the driving means, for instance, by varying the number of teeth in the individual gear, by varying the diameter of the star-shaped gear or by other suitable means well known to the skilled mechanic.

As stated, each of the treating containers such as the upright cylindrical vessel or the horizontal trough may be used singly or, as is more convenient, in groups of two or more, so that subsequent steps of a processing series may be carried out in sequence without the need for replacement, before each step, of the processing liquid contained in any of the containers. The cylindrical sheet may thus be transferred from one vessel to the next without removing it from its support, being carried through a predetermined sequence of steps in the proper treating liquids and for the predetermined periods of time. The present invention thus provides a convenient method for multistep photographic treating operations. The benefits of this arrangement come readily to mind, if one applies the process and apparatus to the complex multistep color processes which may require up to eleven or twelve individual treating steps.

In addition to the convenience and accuracy just described, the novel process and apparatus utilizing a multiplicity of containers, troughs or vessels offer the further advantage of requiring a minimum of space or working area as compared with the conventional flat trays or tanks. So, for instance, requires an arrangement of eleven upright vessels, of a size which accommodates the usual 8 x 10 inches sheets, a working area of approximately 0.25 square meter in a double row arrangement which measures approximately 90 centimeters long and 26 centimeters wide. The customary flat trays for the same size of sheets require an area of approximately 11 times 0.1 square meter or a total of 1.1 square meter which is more than four times the area required by the new apparatus of the invention. If it is desired to place the conventional flat trays in one line, as is usually the case, a continuous working area of three meters length is required. With larger sizes of photographic sheet materials the saving in working area and floor space made possible by the novel arrangement and apparatus of the present invention is even greater.

The modest space requirements and the compactness of the multicontainer arrangement make the apparatus and process particularly suitable for use in crowded or small darkrooms or in darkrooms which are improvised in kitchens, bathrooms or closets. The small size makes for easy storage also in the small home or apartment, still giving most of the advantages of the more expensive automatic equipment heretofore available.

The compactness of the multicontainer arrangement is in itself an important factor in maintaining proper and constant temperature within the containers holding the treating liquids. Temperature control can readily be achieved by placing the individual container or any number of containers, such as the upright cylindrical vessels or the horizontal troughs of the invention, into one or more water baths of proper size to accommodate the desired number of processing containers. The compactness of the water bath required for the unique containers of the invention and the absence of an excessive free surface area assist in the maintenance of the correct temperature once it has been established, for instance, by filling the water bath with water of the desired temperature. This permits to hold any desired temperature within the processing containers for a relatively long time and may be quite satisfactory where either short operating periods are involved or where the requirements on the absolute temperature constancy are not too critical. Another expedient for holding the temperature in the desired limits is the maintenance of the room-temperature within a narrow range of the desired operating temperature. The said water bath has in this instance a moderating effect, equalizing any temporary deviations of the room temperature from the desired mean value.

However, if maintenance of the proper room temperature is not feasible or desirable, or if operation over long periods of time is desired, the temperature may be maintained by the use of additional heating or cooling means which act directly on the water in the bath. Tubing or heat exchangers which are submerged in the water bath may be used for this purpose. Depending on the desired effect, viz. heating or cooling, liquids which are warmer or colder than the desired temperature in the bath can be circulated through the tubing or heat exchangers to the extent necessary to maintain the desired temperature in the water bath and thus within the treating liquids in the processing containers. Uniformity and accuracy of the temperature control will be assisted by stirring the water in the water bath or by circulation of the water e.g. by the provision of a small pump within or outside the water bath.

Instead of using warm liquids to raise the temperature of the water bath to the desired level and maintaining it there, electric energy may be used with advantage for this purpose. Any type of electric heater is suitable, those of the enclosed type which can be simply inserted or submerged in the water bath are preferred. The electric heaters, the same as the circulating means and the means for supplying heating and/or cooling liquids may be controlled by a thermostat which is contained in the water bath, or at a suitable point of the circulating system. A position in a location in the water bath where temperature constancy is most critical is preferred.

In the complex multistep color processes such as in the Kodak Ektacolor Paper process, the first developer requires the closest temperature control and is most sensitive to temperature deviations from the predetermined level. Usually absolute temperature constancy within $\pm\frac{1}{2}°$ F. is required for uniformity and consistency of results. Placing a sensitive thermostat combined with an electric heating element and, if desired, a stirrer into the water bath close to the location of the said first developer will readily permit maintenance of a temperature in the desired range, automatically and without attention of the operator. The parts making up the said temperature control system are inexpensive and commercially available and thus do not add unduly to the cost of the equipment.

Another modification of the process and apparatus of the present invention comprises the provision of a stream of water of controlled, substantially constant temperature passing through the water bath or baths, circumflowing the processing containers or vessels and troughs contained therein. The supply of running temperature controlled water may be taken from a conventional water heating or mixing device such as the commercially obtainable thermostatic mixing valves which automatically mix hot and cold water in the proper proportions to maintain a constant temperature regardless of reasonable temperature and pressure changes in the supply lines.

The relatively high initial cost of these automatic mixing devices, their dependency on a source of running cold and hot water and the need for an initial adjustment of the desired temperature by trial and error make it preferable to use a source of running water which is provided by a novel method and device which form part of the present invention. The novel method and apparatus do not only provide a stream of water of a predetermined, constant temperature but provide also a constant predetermined velocity of the water stream, delivering substantially equal amounts of the temperature conditioned water per time unit. Thus not only accurately controlled temperature conditions are provided in the water bath but the stream of water may also serve in certain of the steps of the multistep processes as will be described hereinafter in more detail.

The novel device of the present invention for the control of the flow rate of a stream of water comprises as the major components means which are capable of controlling the flow of water such that at all times the water passes through at a predetermined rate and means which are capable of delivering a constant, predetermined amount of heat energy to the water stream. The heat is preferably supplied by an electric heater or heating elements.

The novel water and temperature control device of the invention operates substantially on the following principles. Water taken from the ground or from the faucet of the conventional water supply lines generally has—after it has run for a certain length of time and after the water lines and other parts of the supply system, through which the running water passes have taken on the temperature of the running water—a substantially constant temperature which is usually lower than the processing temperature required for most photographic processes. Many color developing processes are adjusted to be carried out most accurately at a standard 75° F. temperature. Only in extreme cases such as in heat waves in summer will the tap water in some localities have a temperature which exceeds the recommended processing temperature just mentioned. Thus, generally the addition of heat energy will be necessary to raise the temperature of the water supply to the level of the desired processing temperature. Equal amounts of water of constant temperature require identical amounts of heat energy in order to raise the temperature of the running stream of water to a constant higher temperature. In the practical operation, it is only necessary to measure the temperature of the water supply and determine, by simple calculation, the heat energy required for the desired increase of the temperature of the water passing at a constant, predetermined rate over the source of heat energy. As long as the three factors, namely temperature of the water supply, amount of water supplied to the heating means per time unit and amount of electrical energy supplied and converted into heat energy are kept constant, the temperature of the water emerging from the heating device will be constant and exactly at the predetermined and desired level.

The principles of this novel process of the invention can be put into practice by help of simple steps and apparatus. The first step in the process comprises opening the water supply line and taking a few readings of the temperature from time to time. As soon as the temperature of the emerging water has reached a constant level which will normally be the case after about 5 to 15 minutes running time, depending on the local circumstances and on the time of the year, a final reading of the temperature is taken and recorded as temperature A. Conveniently the thermometer indicating the temperature of the tap water is built into the water supply line.

By well-known physical principles the amount of water flowing by gravity through an orifice of given size is dependent on the hydrostatic pressure of the water at the location or level of the orifice. Conversely, at constant hydrostatic pressure, constant amounts of water per time unit flow out of an orifice of controlled size thus providing a flow of water at constant rate. By the application of this principle, viz. keeping the hydrostatic pressure of a free flowing water supply constant while the water is flowing through an orifice of a predetermined size the process of the present invention provides the desired constant flow rate of the water supply. There are several means available which permit the maintenance of a constant hydrostatic pressure directly at the orifice. Generally applicable for this purpose are the commercially available pressure valves, which by diaphragm and springs or other means provide an even, predetermined water pressure at the orifice regardless of reasonable pressure variations which might occur upstream in the water supply line. However, reliable, accurately operating instruments of this type are rather expensive and may require constant maintenance and service to keep them in top operating condition.

In accordance with my invention a simple device may be used for the control of the rate of flow of the water. In spite of its apparent simplicity the novel device operates trouble-free for long periods of time, requiring only a minimum of care and maintenance.

An embodiment of this apparatus is shown in FIGS. 19 and 20 of the accompanying drawings. FIG. 19 is a top plan view and FIG. 20 a vertical section of the metering device 120 taken along lines 20—20 of FIG. 19. The apparatus comprises vertical tubular member 121, open at the top and with its lower end joined to inverted frusto-conical member 122. The latter is provided at the apex with threaded cylindrical flange 123 over which is screwed threaded nipple 124 with central orifice 125. The lower portion of the tubular member 121 with frusto-conical member 122 and nipple 124 is surrounded by funnel 126 with lower tubular outlet 129. Funnel 126 is attached with its upper ring-like portion 127 over gasket 128, with aerating aperture 137, to the lower portion of tubular member 121.

The wall of tubular member 121, in its upper portion is penetrated by inlet tube 130. Inlet tube 130 is connected and leads into chamber 131, the bottom and sidewalls of which are joined to the adjacent wall section of tubular member 121 and which chamber is open at the top, forming an overflow for the water entering through inlet tube 130. The diametrically opposite wall section of tubular member 121 is penetrated by outlet tube 132. Outlet tube 132 slants downwards. Its wider upper walls are joined to vertical tubular overflow member 133 having an upper edge 134. The latter is at a substantially higher level than the upper end of chamber 131. Separator walls or baffles 135 are radially arranged in the interior of tubular member 121. They are joined in the center in star-like fashion, their central joint 138 coinciding with the vertical rotational axis of metering device 120. Narrow, elongated gaps 136 separate the vertical edges of the separators 135 from the circular wall of tubular member 121 following substantially the outline of the latter including its lower inverted frusto-conical portion. The separators or baffles extend vertically upwards from a level slightly above the nipple 124 to a height just below the point where the outlet tube 132 penetrates the wall of tubular member 121. The device 120 is operated by connecting inlet 130 with a source of running water. The water flows into the chamber 131, losing therein most of its momentum and turbulence before it overflows into the space enclosed by tubular member 121 and the lower inverted frusto-conical member 122. The flow rate of the incoming water is adjusted to be higher than the rate at which the water leaves the device through orifice 125 and outlet tube 129 of the funnel 126. Thus the device will be soon filled with water to the level of the circular edge 134 of overflow tube 133, whereupon the excessive amounts of water entering the device flow over edge 134 into overflow tube 133, leaving the device through outlet tube 132.

As soon as the constant, predetermined level of the water—as defined by edge 134—has been achieved the rate of the water flowing through orifice 125 is constant and will remain constant as long as at least some water is flowing over edge 134. The separators or baffles 135 serve to stabilize the downward flow of water in the device, preventing eddying and other turbulence which would cause undesirable changes in the rate of flow of the water leaving the device through the orifice. Another modification of metering device is shown in FIG. 21 which represents a schematic vertical section thereof. The metering device 145 comprises a long, relatively narrow vertical tube 146 to the top and bottom of which are joined curved tubular sections 147 and 148. Top section 147 forms a rounded bend of approximately 180° with outlet 149 at one end while bottom section 148 is formed by two angular portions of about 90° and vertical section 150 which ends in a threaded coupling 151 of a kind and size which fits over the threads of a standard household water outlet.

To the left, nipple 152 with orifice 153 is joined to the wall of vertical tube section 146 with a connection to the interior of the tube so that water standing in the tube may flow through the orifice. Nipple 152 is surrounded by and contained in chamber 154, which is open at the top, and which has outlet tube 155 in its bottom portion. The sidewalls of chamber 154 are joined (not shown) to the wall of vertical tubular section 146. Water entering vertical tubular section 146 from its lower curved portion 148 rises in the vertical portion of the tube. When it reaches the level of the orifice 153, part of the water will emanate through the orifice into the chamber 154, which it leaves through outlet 155. The rate of flow of the incoming water is adjusted to exceed the rate of flow of the water leaving the device through orifice 153 so that the water will continue to rise in the tube and the excess will flow over the edge 156 formed by the lower wall section of the upper curved section 147, leaving the device through outlet 149. The height differential between the center of the orifice 153 and the upper edge 156 in the tube will determine the hydrostatic pressure and the rate of flow through a given orifice size. As long as at least some water is continuously flowing over the edge of overflow 156, the hydrostatic pressure and thus the flow rate of the water stream leaving through outlet 155 are substantially constant. A thermometer built into the horizontal section of lower curved portion 148 of the tubular arrangement may serve as a means to make temperature readings of the incoming water (temperature A) as has been described hereinbefore.

As has been shown, the device and process of the invention are operated by the provision of a column of water of substantially constant height over a fixed orifice through which water flows at a substantially constant rate which rate is determined by the size of the orifice and by the hydrostatic pressure exerted by the water column of controlled height. It is of advantage to use an orifice which has relatively large opening e.g. of one or several millimeters up to 1 cm. or more and preferably of 2 to 6 mm., depending on the dimension and size of the apparatus. The expedient of using relatively wide orifices will avoid plugging or partial obstruction of the orifice by particles contained in the water supply and carried to the orifice with the streaming water. If a narrow orifice is desired to be used a filter or sieve of a pore or mesh size which will hold back particles of appreciable size may be placed upstream of the orifice e.g. into the inlet tube 130 of metering device 120 (FIG. 20). Thus, the effective size of the orifice may be readily kept constant by avoiding its partial obstruction by foreign matter. Occasional cleaning of the orifice will assist in maintaining the desired effective size accurately. If desired, the so-called self-cleaning type of orifice may be used.

The proper ratio of orifice size to the height of the column or to the hydrostatic pressure, respectively, depends on the amount of water which is desired to be delivered per time unit and on the particular design of apparatus used. Experiments have shown that one liter of water per minute passes through an orifice of approximately 3 to 4 millimeter diameter, if it is under the hydrostatic pressure exerted by a water column of approximately 20 cm. height. Proper orifice size and height of the water column can be readily established by simple tests or by calculation for any desired rate of water flow. The above values will serve as an indication of the relationship of the factors. Doubling the cross section area of the orifice, while maintaining the height of the water column constant will approximately double the rate of water flow through the orifice. Depending on the size of the photographic treating apparatus several hundred cubic centimeters to several liters of water per minute will be sufficient to accomplish the aims of the present invention.

As was shown hereinbefore, the height of the water column is readily maintained at a constant value or level by feeding the water, upstream of the orifice, at a rate exceeding the desired downstream flow and removing the excess water by way of an overflow. Highest accuracy is achieved if the linear extension of the overflow is kept as large as possible under the circumstances. In the practical operation the operator need only observe the overflow and adjust it in such way that it does not cease at the lowest line pressure expected during any operating session. Adjustment and readjustment of the rate of overflow is possible without any adverse effect on the accuracy of the method.

If desired the hydrostatic pressure exerted by the water column may be supplied by a diaphragm-spring arrangement which is adjusted to provide the desired water pressure at the orifice. It may be of a type which permits escape of excessive amounts of water through an overflow venting tube. Other pressure controlling devices may be used with similarly good effect.

By the steps and device described in the foregoing a stream of water of constant rate of flow and of known constant temperature (temperature reading A) emerges from the downstream side of the orifice. In order to raise the temperature of this stream of water to the desired value, e.g., 75° F. it is only necessary to supply the differential in heat energy to the water. The approximate heat energy required per minute may be calculated by multiplying the specific heat of water with the amount of water emerging from the downstream side of the orifice and the number degrees of the temperature differential between the desired working temperature and the measured temperature of the incoming water supply. The heat energy can readily be calculated as its electrical energy equivalent which may be supplied to electrical heating elements and converted to heat energy which in turn is transferred upon the water stream. Usually the electrical energy supplied to the heating element or elements may need to be slightly higher than the values calculated by the equivalency of electrical and heat energy. A constant factor representing the efficiency of the particular heating element and the heat losses inherent in the particular device can readily be determined. The data and corrective factor thus established may form the basis for the determination and calculation of the electrical energy required to bring about the desired temperature change in a given apparatus under reproducible conditions, and can be incorporated in an empirical factor or equation which can be used for all successive operations.

For practical operation of the process it is only necessary to multiply the electrical energy, required for the raising of the temperature of the incoming water by one degree, with the number of degrees represented by the difference of desired temperature minus actual measured temperature (temperature A) of the incoming water. Multiplying the electrical energy thus calculated by said empirical factor will directly give the electrical energy requirement for a given apparatus to produce a stream of water of constant temperature regardless of the initial temperature of the incoming water, the only requirement being that the temperature of the incoming water and its flow rate be constant over the duration of the operation.

A convenient means of adjusting the electrical energy fed to the heating elements to the temperature of the incoming water—this being the only variable in a system in accordance with this embodiment of the present invention—is a continuously variable resistor which may be included in the electrical heating circuit. The resistor may be provided with markings which indicate the correct setting required for each temperature of the incoming water (temperature A). Thus a single setting of the resistor or rheostat to the temperature marking indicating the actual reading of the temperature of the incoming water will automatically provide for the correct temperature of the water leaving the device at the outlet side.

The preferred modification of the apparatus of the invention does not require a high powered resistor or rheostat. The temperature control device comprises primarily a multiplicity of heating elements which are suitably varied with regard to their full heating capacity and consumption of electrical energy. By proper combination and correlation of two or more of the multiple heating elements any desired increase of the temperature of the known amount of water of known constant temperature, passing by the heating elements per time unit, can readily be achieved by switching in or out one or more of the heating elements as needed without the undesirable generation of excessive heat and loss of electrical energy in the rheostat or resistor. Closest control of the temperature of the water stream by simple and inexpensive device and construction is thus possible.

The temperature of the incoming water may vary from approximately 32° to 75° F. or higher depending on the season of the year and the special local conditions. A minimum of six heating elements of various definite capacities are needed to cover the range from 32° to 75° F. in steps of 1° F. Covering this range in steps of 2° F. will require five heating elements of correspondingly spaced capacities. With steps of 5° F. the number of heating elements may be reduced to only three. Economy of construction and simplicity of design make it desirable to employ the smallest possible number of heating elements, if this can be accomplished without sacrificing the desired close control of the temperature of the outgoing stream of water say within ±½° F. This accuracy is possible to a very high degree by the provision of three major heating elements with the said 5° F. steps of capacity and of an additional smaller heating element whose capacity covers the gap of 5° F. left by the major heating elements. This additional or adjuvant heating element may be rheostatically or thermostatically controlled as will be shown hereinafter, providing the fine control of the temperature within a 5° F. range.

A temperature control arrangement of the present invention, employing four heating elements has been depicted schematically in FIG. 22 of the accompanying drawings. One terminal each of heating elements 181, 182, 183 and 184 is directly connected, over electrical conductor 185, to one terminal of the source of electrical energy, such as a regular wall outlet. The second terminal of each heating element 181, 182 and 183 is connected to conductor 190 with one of switches 186, 187 and 188 contained in each connecting line. The second terminal of heating element 184 is connected to conductor 190 over rheostat 189. Conductor 190 connects into the second terminal of the source of electrical energy.

The heating capacity of each of the heating elements has been expressed and is indicated in FIG. 22 by a temperature designation (° F.). The designation 20° for heating element 181 indicates that the element is capable of raising the temperature of a given stream of water, flowing at a predetermined constant rate over the heating element, by 20° F. Correspondingly, heating element 182 is capacitated to raise the temperature of the same stream of water by 10° F. and element 183 by 5° F.

The heat output of the adjuvant heating element 184, which is rheostatically controlled, may be continuously varied to bring about any desired increase of the temperature of the stream of water in the range from 0° to 5° F. (the latter being the full capacity).

Any one, two or all three heating elements 181, 182 and 183 may be switched into or out of the electrical circuit by closing or opening the correlated switches 186, 187 and/or 188. This operation involving the three major heating elements permits to increase the temperature of a stream of water having a temperature in the range from 35° to 75° F. to fall into the range from 70° to 75° F. The additional heat energy required to bring the temperature to exactly 75° F. will then be supplied by heating element 184 which will be adjusted to the proper heat output by operation of rheostat 189.

Figure 24:
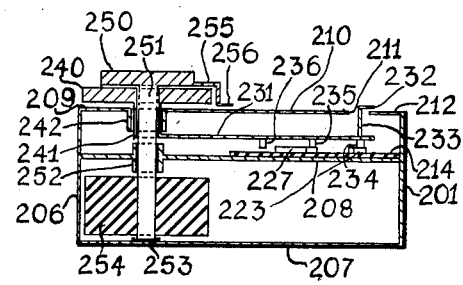
Figure 25:
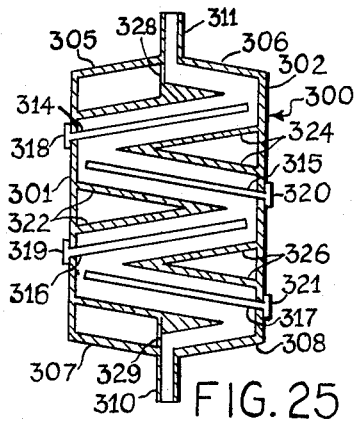

Instead of controlling the major heating elements by the actuation of individual switches one may with advantage employ a switch arrangement as is shown in FIGURES 23 and 24.

FIG. 23 is a top plan view of switching device 200 and FIG. 24 is a vertical section taken along lines 24 of FIG. 23. Switching device 200 comprises a housing with half-cylindrical wall section 201, wall sections 202, 203, 204, 205 and 206, bottom plate 207, intermediary support plate 208 with insulating section 214 joined to its upper side and a top made up of half-circular sections 209 and 210, half-circular slot 211 and half-circular section 212 at the outer edge of the top joined to half-cylindrical wall section 201. Section 210 of the top of device 200 has been omitted and removed in FIG. 23 to show curved electrical contact members (made of an electrical conductor) which are fixedly joined to the insulating section 214 in three series each series forming a half-circle or a part thereof. Each group of contact members contained on a half-circle is coordinated to one heating element. The outer group containing contact members 221, 222, 223 and 224 are electrically interconnected (not shown) and, as a group, connected to a heating element having a 5° F. heating capacity, such as element 183 in FIG. 22. The second group of curved contact members contained on the second half-circle is made up of contacts 226 and 227 which are likewise interconnected and connected as a group with one of the terminals of a heating element having a heating capacity of 10° F. such as heating element 182 in FIG. 22. The third series of contacts is formed by the sole and longest contact member 229 which is electrically connected to a heating element of 20° F. capacity such as element 181 in FIG. 22. The groups of contact elements are isolated from each other by having been mounted on insulating section 214. The length and relative location on the half-circle of each of the contact members within each series is critical as will be shown hereinafter.

Insulated knob 240 is rotatably mounted in the center of the half-circles formed by the half-cylindrical wall section 201 or by the half-circular contact arrangement. To the center of the lower side of knob 240 is joined cylindrical hollow shaft 241 which is rotatably supported by bearing 242 (shown in FIG. 24). To the lower end of hollow shaft 241 is connected contact bar 231 (of an electrical conductor) which extends horizontally over and across the three half-circles of contact members. Contact springs 234, 235 and 236 are fastened to the lower side of contact bar 231 in such spacing that they are located over the half-circular contact members and contact (to establish electrical connection) any of the contact members over which they might be located by rotating knob 240 and the bar 231 joined thereto. Contact bar 231 is electrically connected (not shown) with one terminal of the source of electric power such as over conductor 190 in FIG. 22. The peripheral free end of the contact bar carries connecting 233 member and pointer 232 joined at a right angle to the upper end of connecting member 233 so that the pointer lies above top section 212. The half-circular section 212 of the top of device 200 is provided with a scale of temperature markings in 5° F. steps as is shown in FIG. 23. The pointer 232 is oriented and located such that it moves on approximately the half-circle formed by the scale as knob 240 is turned.

Smaller insulated knob 250 is mounted concentrically with and above knob 240 and is joined with vertical shaft 251 which extends downwards through hollow shaft 241. Shaft 251 is rotatably supported by pivot point 253 and circular bearing 252. Rheostat 254 which is partially contained in the extension of the housing formed by side wall sections 204, 205 and 206, is connected to shaft 251 by mechanical means so as to be actuated and varied in its power output by rotation of knob 250. Knob 250 is provided with fixedly joined horizontal strip 255 which continues and terminates in pointer 256 at its free end. Section 209 of the top of device 200 is provided at its upper side with half-circular scale 257 which carries temperature markings beginning on the left with −4° F. and continuing to the right in 1° F. steps with subdivision in one tenth degrees (not shown) to 5° F. inclusive. The capacity and output of the adjuvant heating element which is electrically connected to and controlled by the rheostat, and the corresponding settings of the pointer 256, are correlated and marked on scale 257. The setting marked 5° F. corresponds to zero output of the rheostat and the setting zero on the scale corresponds to an output of the rheostat to give the adjuvant heating element a capacity of 5° F. The setting −4° F. corresponds to a heating capacity of 9° F. Thus in this device the continuously variable heating element (corresponding to element 184 in FIG. 22) has a total capacity of 9° F. The excess capacity of 4° F. may serve to provide the additional heat energy required if the temperature A of the incoming water is below 35° F. which is the lowest setting on scale 212. Pointer 232 thus will be set at the 35° mark and pointer 256 at the −1° mark if the temperature reading A of the incoming water is 34° F. (35° F.—1° F.) and so forth. The excessive capacity of 4° F. of the variable heating element may also be utilized to make minor adjustments in the total heat output of the composite multi element device of the invention as will be shown hereinafter. This is facilitated by curved elongated slots 260 and screws 261 in scale 257 which permit radial shifting and resetting of the whole scale for purposes of adjustment.

The operation of switch device 200 is as follows. After taking temperature reading A of the incoming water stream, the insulated pointer 232 and contact bar 231 are set to the next lowest marking on the scale 212 by turning knob 240. This setting connects the proper combination of the major heating elements to the power source to increase the temperature of the water to a level between 70° and 75° F. By turning smaller knob 250 and setting pointer 256 to the number or marking which corresponds to the difference in degrees Fahrenheit by which temperature reading A exceeds that of the setting of pointer 232. The rheostat thus feeds to the adjuvant heating element the power required to raise the temperature of the water by the number degrees being the difference 5—y wherein y is the number set on scale 257. The total electrical energy thus supplied to all the heating elements in operation increases the temperature of the water to exactly 75° F.

FIG. 23 shows a setting of pointer 232 and pointer 256 which corresponds to a temperature reading A of the incoming water stream of 70° F. As can be seen, none of the major heating elements receive power. The rheostatically controlled adjuvant heating element receives enough electrical power to raise the temperature of the water stream by 5° F. (5° F.—0° F.) to 75° F. With a temperature reading A of the incoming water stream of 57° F. pointer 232 would be set on the 55° mark and pointer 256 on the 2° mark as is indicated by broken lines. With this setting one heating element connected over contact member 223 provides a temperature raise of 5° F., another heating element over contact member 227 one of 10° F. and the adjuvant heating element one of 3° F. (5°—2° F.), a total of 18° F. to bring the temperature of the water stream up to 75° F. With a temperature reading A of 35° F. of the incoming water stream pointer 232 would be set to the 35° mark and pointer 256 to the zero mark. This setting connects all three major heating elements and the adjuvant heating element with a 5° F. heat output, producing a total temperature increase of 5°+5°+10°+20°=40° F. to raise the temperature of the water stream to 75° F. As can be readily seen, the switch and heating device as shown in FIGURES 23 and 24 is capable of automatically providing a constant temperature of 75° in the outgoing stream of water for any temperature of the incoming water up to 75° F. by requiring one temperature reading and two simple settings.

The switch device may be modified in any desired manner, for instance, in such manner that the master contact bar moves in a straight line over suitably arranged series or groups of individual contact members arranged by the same principle but in a straight line arrangement instead of the circular arrangement. The number and/or the capacity of the individual heating elements may be changed to produce any desired final temperature of the water stream other than the 75° demonstrated hereinbefore.

As has been shown, it is generally preferred that the range of temperature increase or capacity provided by the adjuvant heating element and its coordinated rheostat be somewhat larger than the temperature gap actually to be covered. The device is thus made more flexible by the fact that it is capable of providing temperature increases larger than that required by the gap left by the major heating element combination. Depending on the circumstances and conditions the adjuvant heating element and the coordinated rheostat, if such is used, may be designed to cover up to double or three times the gap i.e. 4 to 6 degrees or more in the case of a 2 degree gap and up to 10 degrees or more in the case of the 5 degree gap. With this provision the device is capable of meeting even the most unusual conditions such as line voltage deviations of 20% or more as well as other unusual conditions in the rate of water supply, extreme heat losses by low room temperature and so forth.

If desired, a thermometer may be provided in the water stream, downstream of the main heating elements but upstream of the adjuvant heating element. The additional thermometer permits the taking of intermediary readings of the preheated water which can be directly utilized for the setting of the rheostat. This method provides for even higher accuracy and convenience in the operation of the process, because it compensates for any inaccuracies and deviations introduced by an inaccurate rate of flow of the water stream and by uncontrollable fluctutaions of the voltage of the power supply. As can be readily visualized, deviations of the flow rate of the water stream or of the line voltage of for instance 10 percent will, in the case of the two degree step result in a deviation of the final temperature of the outgoing water stream of only 0.2° F. and with the five degree step of only 0.5° F., if the expedient of taking intermediary readings on the additional thermometer is used. These deviations are the maximum and will often be smaller depending on how much of the capacity of the adjuvant heating element is utilized. Deviations of 0.2° to 0.5° F. from the desired mean value are acceptable even in those photographic processes which require the most exacting temperature control. Using the direct method of heating the water stream by a single correspondingly high powered rheostatically controlled heating element a deviation of the line voltage of 10 percent from its mean value would result in a deviation of the temperature of the outgoing water by at least 3° F. in the case of a temperature reading A of 45° of the incoming water. The method of the invention can be made to be even more accurate, if this is desired, by providing a second independently rheostatically controlled adjuvant heating element. The capacity of this element need be only small to serve for the compensations found necessary by the reading of the downstream thermometer, which in this case would be placed downstream of the first adjuvant heating element.

Of course, variations of the line voltage may also be compensated by adjustment of the electrical power input into the heating elements as a group e.g. by the provision of a master rheostat in the power supply line which is adjusted in accordance with readings taken from a volt meter at the power line. If desired, any of the commercially available voltage stabilizers may be used with equal benefit. However, any of the high powered equipment of this type is rather expensive and will not be in reach of the average amateur photographer. The rheostats employed in the device of the present invention as described hereinbefore are designed for a small power input and thus relatively inexpensive.

In a further modification of this device the rheostats and thermometers are dispensable if the adjuvant heating element is thermostatically controlled. This modification is the preferred one because of its completely automatic operation and independence of any reasonable fluctuations of flow rate and line voltage. The small power input of the adjuvant heating element permits the use of a relatively small thermostat which should be accurate within ½° or better ¼° F. and optionally ⅒° F. The thermostat will be employed with the above described switch device of which only the rheostat and its controls have been omitted. The periodical opening and closing of the power supply by the thermostat will only affect and act on the adjuvant heating element thus producing only small fluctuations of the water temperature between on and off cycles. This is much to be preferred to the relatively large fluctuations which cannot be avoided if a high powered heating element is controlled by a correspondingly larger dimensioned thermostat.

The thermostat and its heat sensitive element are generally located downstream of all heating elements including the adjuvant heating element controlled by it. As has been mentioned, the thermostat opens and closes the power supply to the adjuvant heating element only and does not affect the supply of the major heating elements. An even higher accuracy and completely automatic temperature control, independent of fluctuations in the water supply and of the line voltage, can be achieved by combining the above described switch device, with three major and one adjuvant heating elements, with an additional very small powered auxiliary heating element which is independently controlled by a small, sensitive thermostat.

As in the rheostatic control method described above, the adjuvant heating element is here with advantage also designed for a somewhat higher capacity than is needed to bridge the gap left by the major heating elements. It is also of advantage to locate the thermostat in a position in the water stream where it has a wide cross section and accordingly a low flow velocity.

Instead of using a water stream of constant rate of flow as the temperature conditioning medium another modification of the process utilizes a stream of water having a varying flow rate. In this modification of the process the water may be directly taken from the water supply line, with substantial reduction of the pressure and flow rate by the insertion into the path of the water of a calibrated orifice. Increased pressure in the supply line, upstream of the orifice, forces more water through the orifice, which requires a proportionally higher input of electrical or heat energy in order to maintain the temperature of the water stream constant at the desired level. With reduced pressure in the supply line the energy input must be correspondingly reduced. This can be readily accomplished by the provision of a diaphragm in one-sided contact with the water in the supply line at a point upstream of the calibrated orifice. The movement of the diaphragm, caused by the pressure variations is utilized to actuate a rheostat or similar device in such manner that the electrical energy entering the heating element or elements is proportionally increased with increasing pressure and reduced with decreasing pressure in the water supply line. Thus this method and device permit the maintenance of a constant temperature in the water stream independent of any changes in line pressure and variations in the flow rate resulting therefrom. This device may be operated with one single high powered heating element or with a multiplicity of heating elements in combination with the switch device described hereinbefore.

The heating element or elements, in any of the water temperature control devices described hereinbefore, may be contained in a passageway or in a chamber or similar confined area through which the stream of water passes. Though the orientation and arrangement of the heating elements relative to the path of the water stream is not critical, it is generally preferred that the water passes first over the higher powered elements with the lowest powered or the adjustable and variable element last. The heating elements are preferably designed in such manner that they offer a large surface to the flowing water for ready heat exchange. Guide walls or baffles, diverting the flow of the water, for instance in a zig-zag manner permit a more compact design of the heating device. Obstructions or other means such as sudden turns in the direction of the path of the water stream will assist in the mixing of the water so that it assumes the desired average temperature over its entire cross section. In order to avoid accumulation of gas bubbles or gas pockets in the heating chamber or channel with the resultant loss in efficiency of heat exchange between the heating elements and the water it is generally of advantage to have the water stream flow at an angle to the horizontal and preferably slightly upwards. This expedient permits any gas or air bubbles which enter the heating device or which form therein by the effect of the heat at the heating elements (dissolved air and gases), to travel upwards by their own buoyancy in the direction of the traveling water stream. Thus any undesirable accumulation of air or gas bubbles in the heating zone is virtually impossible.

Figure 26:
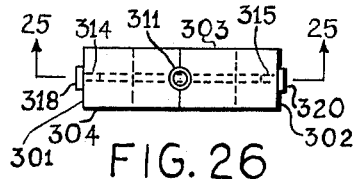

An embodiment of the heating chamber, utilizing these expedients, is shown in FIGURES 25 and 26 of the accompanying drawings. FIG. 26 is a top plan view of heating chamber 300 and FIG. 25 is a vertical section thereof taken along lines 25 in FIG. 26. Heating chamber 300 comprises two narrower vertical wall sections 301 and 302 in parallel arrangement and the wider vertical wall sections 303 and 304 likewise in parallel arrangement and in rectangular arrangement to the former. The rectangular chamber thus formed by the four wall sections is closed at the top by slanted wall sections 305 and 306 and at the bottom by slanted wall sections 307 and 308 joined to the side walls. Inlet 310 is provided at the center of the bottom and outlet 311 at the top of the chamber. Heating elements 314, 315, 316 and 317, corresponding to heating elements 181, 182, 183 and 184 respectively, of FIG. 22 extend across the chamber, slanting upwards. They are penetrating and removably inserted through openings in the narrower wall sections, elements 314 and 316 penetrating narrow wall section 301 at the left and elements 315 and 317 penetrating narrow wall section 302 at the right. Tight seal is achieved by gaskets (not shown) and front plates 318, 319, 320 and 321 provided at each of the outer ends of the heating elements which contain also the terminals of the heating elements for connection with the power source, for instance over the switch arrangement shown and described hereinbefore. The heating elements are separated from each other by triangular baffles 322, 324 and 326. The baffles extend over the full width of the chamber from wide wall section 303 to wide wall section 304, to which they are joined, and nearly across the chamber from one narrow wall section to which they are joined to the opposite narrow wall section leaving however a gap or space at the opposite wall section. Baffle 322 is joined to the narrow wall section 301 separating heating elements 315 and 316, and triangular baffles 324 and 326 are joined to narrow wall section 302 at the right separating heating elements 314 and 315 and 316 and 317 respectively.

This particular arrangement of the triangular baffles leaves a relatively wide passageway having four distinct straight sections following a zig-zag pattern. Each slanted section of the passage way contains in its central portion one of the heating elements in substantially parallel arrangement with the neighbouring walls of the triangular baffles. Additional irregularly shaped baffle 328 at the top and baffle 329 at the bottom of the chamber form the entrance and exit portion of the passage way and provide the connection with the tubular outlet 311 at the top and tubular inlet 310 at the bottom.

A stream of water of constant flow rate may be taken from the outlet portion of any of the above described metering devices, for instance, from the devices shown in FIGURES 19 and 20 or 21. The outlet of these devices is connected, by suitable conduit, to the inlet of the heating chamber. The stream of water entering inlet 310 is diverted by baffle 329 to the right, passes upwards over heating element 317 to the left, changes its direction to the right to pass over heating element 316, then to the left over heating element 315 and to the right again over element 314. From there it changes its direction to the left following the passage between irregularly shaped baffle 328 and upper slanted wall section 306, leaving the chamber through outlet 311 at the top. The water stream now having a perdetermined constant temperature may be directly fed, through suitable conduit, to the water bath surrounding one or more of the cylindrical treating containers of the invention.

The water stream flows, as a result of the substantially enlarged cross section at a relatively slow velocity over the heating elements of heating chamber 300 taking up the heat energy released by each element. The repeated change of direction assists in the mixing of the streaming water, avoiding the formation of layers of water of different temperatures. If desired, additional baffles and obstructions may be placed into the path of the water to enlarge the mixing effect even further. The expedient of placing the highest powered heating element closest to the entrance of the water stream into the heating chamber does further assist in achieving uniform temperature conditions in the water leaving the device. The heating chamber and the connections and conduit to and from the chamber may be insulated to minimize the effect of uncontrolled radiation of heat.

In another modification of the invention the water stream may flow in a vertical direction, for instance in an alternating downwards and upwards path which may be oriented horizontally or vertically. The heating zone may be designed as an integral part of the water metering device or of the photographic treating apparatus or water bath respectively or, if desired, as an independent self-sufficient unit. The latter may find wide use in applications other than for photographic treating apparatus. In its application to the process and apparatus of the present invention the heating chamber is located between the water metering device and the water bath surrounding the vessels or troughs of this invention. In order to assure an even, uniform flow rate of the water stream through the system certain critical limitations must be observed with respect to the relative vertical positioning of the various units. The orifice of the metering unit should be located higher than the highest point reached by the water in the heating chamber or unit. The latter may be located higher or lower than the level or surface of the water in the bath surrounding the vessels or troughs. However, the orifice of the metering device must in any event be located higher than the surface of the water in the bath. At least an inch and preferably several inches up to 10 inches or more height differential will ensure steady, trouble-free flow of the water stream from the metering device through the heating device into and through the water bath and from there into the sink or other place of disposal. The individual devices or units, if not constructed as a unitary device or apparatus, may be connected by tubing or pipes or other suitable conduit.

In a preferred embodiment of the invention the heating chamber is located in a low position such as underneath the bottom of the water bath, where it may form an integral part of the latter as is shown, for instance, in FIGURES 30 and 31 of the accompanying drawings.

FIG. 30 is a top plan view of a composite water bath and heating chamber 400 and FIG. 31 is a sectional vertical view of the device of FIG. 30 taken along lines 31. The rectangular heating chamber forms the lower portion of the composite device and is defined by horizontal bottom 462, shorter vertical side wall sections 472 and 473, longer vertical front and rear wall sections (not shown) and the bottom 460 of the water bath. The heating chamber thus formed is divided by slanting baffle 461 into two distinct, wedge-shaped compartments which are connected with each other by slot-like aperture 474. The lower compartment has at the left-hand side inlet 464 and is subdivided by baffles 465, 466, 467, 468 and 469 into six distinct cells, which are interconnected by rectangular openings provided in alternating fashion between the front and rear wall sections respectively and the free ends of each of the baffles. The baffles, being shorter than the wall sections 472 and 473 are alternatingly joined to the longer rear wall sections and to the front wall sections, respectively, as indicated by broken lines 465, 466, 467, 468 and 469 in FIG. 30. This arrangment of baffles and correlating openings converts the lower compartment into a passageway following a zig-zag pattern. Each of the central four cells, making up the central portion of said passageway contains one of the heating elements 481, 482, 483 and 484. The upper wedge-shaped compartment of the heating chamber has, on the left hand side, an outlet formed by rectangular aperture 463 in the bottom 460 of the water bath.

The stream of water, entering through inlet 464 at the left, passes over the heating elements 481, 482, 483 and 484, in this order, as it flows along the passageway making up the lower compartment. It is thereby heated to the desired temperature as has been described in detail hereinbefore. Leaving the lower compartment through rectangular aperture 474 at the right, the water reverses its general direction of flow and passes through the upper compartment which it leaves through slot-like aperture 463 to serve as the temperature conditioning medium in the water bath. This design and arrangement of the composite apparatus provides a streaming layer of temperature conditioned water underneath the bottom of the water bath, thus assisting in the maintenance of an accurate, even temperature in the water bath.

The use of a continuous stream of water of a constant, predetermined temperature as the temperature conditioning medium has many advantages over a stationary water bath. By suitable design of the flow path of the water stream in the water bath, for instance by the provision of baffles and separation walls, underflows, overflows and so forth the stream of the temperature controlled water can be directed in such manner that all parts of the water bath receive a constantly replenishing supply of water of the accurate temperature. Pumps for circulating the bath or stirrers and other mechanical means for disturbing or mixing the water are dispensable. The temperature conditioned stream of water is preferably introduced into the bath at a place where the highest accuracy of temperature is required. Any temperature changes and deviations from the desired accurate temperature level, which may occur in the bath due to heat losses, become effective after the water has left these critical parts of the water bath and has reached places where a minor deviation of the temperature from the mean, predetermined temperature is tolerable. This is true, for instance, in the color developing processes, especially in Kodak's Ektacolor Positive Printing Process. In this process, generally a deviation of only ±0.5° F. from the required temperature of 75° F. is tolerable in the first developer, while deviations of ±1° and sometimes up to 2° F. are permissible in the subsequent steps of fixing and bleaching etc. without adverse effects on the performance.

One of the most important advantages offered by this modification of the invention resides in the possibility of utilizing the flowing water as the medium for carrying out the various washing steps required in the more complex photographic processes. Obviously, the most accurate temperature control of the processing bath and/or of the processing liquids is futile, if the photographic sheets are subjected to intermediary washing steps at temperatures which substantially deviate from the desired, predetermined mean temperature. If the washing step is carried out without proper control of the temperature of the wash water the sheet material will assume a lower or higher temperature, as the case may be, than the desired mean temperature. Generally it will take a certain time after its insertion into the next temperature controlled bath, until its temperature is brought back to the desired level. However, chemical processes and changes are going on in the interim at an uncontrolled temperature with correspondingly falsified results and lacking reproducibility resulting therefrom. These shortcomings have, as is well known, very undesirable effects on the quality of the prints obtained in the color developing processes. Continuous sources of flowing water, of a predetermined constant temperature, are not readily available in the darkroom of the average amateur photographer. Stationary washing baths are undesirable because of their lacking effectiveness resulting from the increasing contamination which they receive during use over a period of time and because of the inherent difficulty of maintaining and controlling their temperature over extended periods of time.

The process of the present invention offers a convenient and reliable solution to this problem. The stream of temperature controlled water is utilized as wash water for the intermediary and/or final washing steps required in any given multistep process. The "Kodak Ektacolor Paper Printing Process" requires four intermediary washing steps under closely controlled conditions. The flowing, temperature controlled water stream of the present invention offers the means to accomplish the washing in an accurate, well-controlled manner creating thus the desired reproducible operating conditions. The unidirectional flow pattern in the water bath, where the washing steps may be carried out, makes it impossible that chemicals or other materials introduced in a later step, are carried back to an earlier stage of the process with possible contamination and detrimental effects on the process. By proper interspersing of the washing steps between the preceding and the succeeding processing steps the wash water will have precisely the mean temperature between said treating steps. Thus any uncontrolled temperature changes in the reactive layers of the photographic sheets are effectively eliminated. In the most preferred modification of the invention one or more cells or chambers are provided between the vessels or troughs in the water bath through which the stream of water flows on it path from around the neighbouring vessel to the next. To effect the washing the cylindrical sheet is simply transferred from the vessel or trough to the washing chamber or cell, retained therein for a predetermined time, and thereafter transferred into the next treating vessel or trough. The washing step may be made more effective, if the water passes over the sheet material in form of a thin layer. This provides for an increased flow velocity and thus in higher effectiveness in removing and carrying away the chemicals from the sheet material. The washing action and its effectiveness may be further increased by movement or rotation of the cylindrical sheet material relative to the stream of water surrounding it. This motion or rotation is preferably in a direction perpendicular to the direction of the stream of the water. Such relative motion or rotation produces small turbulences at and around the surface of the sheet material and promotes the diffusion of the chemicals and the contact of less saturated water with the surface area of the sheet material.

A highly effective washing action may be achieved in accordance with the present invention in a preferred embodiment of the apparatus which comprises a vessel of dimensions and appearance similar to the vessel used for the processing steps described hereinbefore. However, the water-wash vessel is distinguished by the provision of one or more apertures such as openings or slots at or near its bottom through which the water stream may pass in either direction. One modification of this type of vessel is shown in FIGURES 27 and 28 of the accompanying drawings. FIG. 27 is a top plan view of upright washvessel 350 inserted into waterconduit 360 and FIG. 28 is a vertical sectional view of its lower portion and the watercondit taken along lines 28 of FIG. 27. Upright vessel 350 comprises, similarly as the upright treating vessel described hereinbefore, circular bottom 352 and cylindrical vertical wall 351 which at its top portion is provided with one of the centering and supporting means described hereinbefore (not shown). Pivot point 353 is provided at the inside center of the bottom to receive the lower axle of the circular support. Close to its lower edge the cylindrical wall has rectangular slots 354 all around its circumference at a position low enough to fall within the waterconduit 360 when the vessel is inserted. The water conduit comprises as its major components bottom plate 361 the diameter of which is substantially larger than that of the vessel. About three quarters of its circumference are joined to curved convex wall section 362 which continues to the right in straight portions 365 and 367 with a corresponding extension of the bottom plate and top 364, leaving at the right substantially rectangular opening or inlet 366. The left circular portion of the waterconduit has a concentric circular opening in its top portion of a size to permit slip-fit insertion of the just described water-wash vessel 350. With the vessel inserted the conduit forms a channel completely surrounding the lower portion of the vessel. Water flowing into inlet 366 of the waterconduit flows in circular fashion into the circular conduit formed by the outer portion of bottom plate 361 of the cup-shaped conduit, convex wall section 362 and the lower portion of wall 351 of the vessel. The water is thus distributed all around the washing vessel 350 entering by hydrostatic pressure through slots 354 at all points around the periphery, filling the vessel 350 and flowing in a continuous stream upwards and overflowing at the top edge of the vessel.

The cylindrical sheet fastened on its support may be inserted into this vessel in much the same way as it has been described with regard to the upright vessel for the chemical processing solutions. Upon insertion of the closed drum-type support into the wash-vessel most of the water contained in the filled washing vessel 350 overflows at the top at a rapid rate as the drum-type support replaces its volume. This is very beneficial and favorable. The sheet containing the concentrated chemical treating solution is rapidly flushed by large amounts of water which quickly carry away the major amount of the chemicals thus making the washing step of the invention even more effective.

Rotation of the cylindrical sheet around its vertical axis may be accomplished in the manner described hereinbefore. In fact, the means of rotation as well as the driving means used in the washing step preferably of the same type and dimensions as those used in the other steps of a multistep process, so that the cylindrical support may be forwarded from step to step including the interim and final washing steps without requiring any adjustment or change of the driving means contained on the support of the cylindrical sheet. Best results and highest efficiency in the removal of the chemicals from the cylindrical sheet is usually achieved by the use of the closed drum-type support described hereinbefore.

If the water is introduced at the top of the vessel e.g. by overflowing the upper edge of the vessel, it flows downwards and leaves the vessel through the openings or slots in the lower portion of the vessel. The overflowing or underflowing water passes on from there to serve as the external temperature conditioning medium in the next treating step. In a later stage of the process it may again serve as the washing medium.

Though it is generally not desirable that water carrying chemicals serve as the washing medium, it is in the present process, with its constantly flowing stream of water not a major problem. In most photographic processes, later steps are not very sensitive to chemicals used in an earlier step. This is inherently so because it is not always possible to quantitatively remove the chemicals in intermediary washing steps and the chemicals are selected with this in mind. Furthermore chemicals carried through from an earlier washing step usually have been washed away or are so diluted that adverse effects can be ruled out. Harmful decontamination of a processing bath or of the sheet material in an earlier stage by chemicals used in a later step is virtually impossible because of the unidirectional flow-pattern of the water in the process of the preferred embodiment of the invention. Thus, one of the gravest sources of failure or less than perfect results has been safely eliminated by the unique design and arrangement of the preferred process and apparatus of the invention. In a process like Kodak's Ektacolor positive paper printing process, the intermediary washing steps are usually relatively short. The varying durations of the other processing steps require proper spacing of consecutive runs so that overlapping or simultaneous carrying out of two or more intermediary washing steps can safely be avoided.

The horizontal trough may be modified in similar manner to serve as the washing trough when this version of the apparatus is used. FIG. 29 is a top plan view of a horizontal trough of a design and dimensions similar to those described hereinbefore and particularly to that shown in FIGURES 16 and 17. Trough 37 having half-cylindrical bottom 371, half-circular faces 372 and 373 and bearings 374 and 375 in the center of the half-circular facing wall sections is distinguished from the trough described hereinbefore that the bottom, at its lowest point is provided with rectangular slot or opening 376 extending nearly over the whole length of the trough.

As is readily apparent water will flow through slot 376 filling the trough when it is inserted into a water bath. Feeding a stream of water into the water bath will cause the water to continuously pass through the vessel overflowing at the top from where it can be diverted into the next water bath or compartment. When the cylindrical support is inserted in bearings 374 and 375 as described hereinbefore, the water will flow continuously through the narrow space left between the cylindrical wall of the trough and the surface of the cylindrical sheet exerting a continuous effective washing action. Rotation of the cylindrical sheet around its axis will assist in increasing the effectiveness of the washing step.

A composite apparatus in accordance with the present invention wherein the stream of temperature-conditioned water serves the two functions of maintaining the desired temperature in a series of processing vessels and serving also the function of the wash-water in one or more washing steps is shown in FIGURES 30 and 31 of the accompanying drawings. FIG. 30 is a top plan view of photographic treating apparatus 400 which is designed and adapted to accommodate an eleven step photographic treating process such as Kodak's Ektacolor positive paper printing process as it is presently recommended by this company. FIG. 31 is a vertical section taken along lines 31 of FIG. 30. The rectangular apparatus comprises two shorter vertical side-walls 401 and 403 and longer vertical side-walls 402 and 404 which form with the bottom 460 the rectangular water bath. The water bath is subdivided into eleven individual square cells, each of which is formed by divider sections 405, 406, 407 or 408 respectively and a portion of the vertical outside wall or walls. Divider sections 407 and 408 extend from the bottom of the water bath where they form a tight or substantially tight seal to the height of the outside walls of the water bath. Divider 406 extends from the bottom of the bath to a height somewhat below the intended water level in the bath so that the water will flow over the upper edge of each of the divider sections 406. Divider sections 405 do not reach to the bottom of the water bath, leaving an aperture at the bottom through which the water may flow. Divider sections 405 and 406 are arranged in a straight line forming a longitudinal separatory wall through the bath. The upper half of the bath is divided into six square cells (FIG. 30). The lower half of the bath is divided into five of the square cells which are displaced by one half of their width against the neighbouring cells of the upper row. Thus two smaller rectangular cells are formed on the left and right end of the lower row. Each of the cells of the upper row and the square cell at the left of the lower row contain upright vessels 430, 431, 432, 433, 434, 435 and 436 respectively, of a kind and construction as described hereinbefore and as shown for instance in FIGURES 13 or 15. The remaining four square cells of the lower row contain washing vessels 437, 438, 439 and 440 respectively of a type described hereinbefore and shown, for instance, in FIG. 28 of the accompanying drawings. The rectangular cell at the left lower corner of FIG. 30 has at the bottom inlet aperture 463 by which it is connected with the heating chamber described hereinbefore. The rectangular cell at the right lower corner of FIG. 30 contains overflow 413 with its upper edge at a height coinciding with the intended level of the water in the water bath. Outlet 414 is connected with overflow 413.

The stream of temperature conditioned water coming from the heating chamber below the water bath and entering the left rectangular cell through aperture or inlet 463 rises in this cell to the level determined by the upper edge of divider section 406 into the square cell containing vessel 430 which cell it leaves through aperture 471 at the bottom of divider section 405 entering the square cell containing vessel 436. The water rises in both cells until it reaches the level of the upper edge of divider section 406 over which it flows filling the next pair of cells. Vessel 437 contained in the next and second square cell in the lower row is the already described washing type vessel which is inserted in the water conduit 360 shown in FIG. 27. The rectangular opening 366 of the water conduit is fitted into the aperture 471 below divider section 405. The water passing through the aperture from the preceding cell enters the water conduit and from there the washing type vessel through openings 354 (FIG. 28) rising in the vessel until it overflows into the surrounding cell where it rises until it flows over the upper edge of divider section 406 into the next pair of cells and so forth until it leaves the last square cell in the upper row to enter, through aperture 471 at the lower end of divider section 405, the right rectangular cell, rising therein until it reaches the level of overflow 413, leaving the apparatus through overflow 413 and outlet 414. Motor 446 on the left narrow end of the water bath is connected by shaft 415 with pulleys 420 and 421. Shaft 490, rotatably contained in bearings 491 and 492 on the right narrow wall section of the water bath, is provided with pulleys 422 and 423. Belts 424 and 425 each are contained on the pair of pullleys 420 and 422 and 421 and 423 respectively, so that the upper portion of the belt is somewhat higher than the upper edge of the bath. Belt 424 is provided on its outside with protrusions 426 and belt 425 with protrusions 427. When operating, the motor drives both belts so that the protrusions may engage in suitable driving means connected to and contained on the cylindrical support inserted in the upright vessel as has been described in detail hereinbefore. The protrusions on belt 424 may be farther spaced providing merely an intermittent rotational motion to the cylindrical support while the protrusions on belt 425 are spaced closely enough to provide a continuous rotation which makes the washing step most effective.

To permit the simultaneous operation of several cylindrical sheets it is preferred that the driving means, e.g. the star-shaped gear contained on the cylindrical support are dimensioned small enough as not to interfere with the rotation of that contained in the neighbouring vessel or vessels. This makes it preferable that the belts run as close to the edge of the bath as is possible, placing at the same time the vessels close to the longer vertical walls 402 and 404, respectively, of the water bath, maintaining at the same time an appropriate distance between the vessels in the upper and lower row. The water conduit 350 shown hereinbefore may, under certain conditions, interfere with the just described positioning of the vessels close to the outside walls. In this case it may be replaced by a horizontal divider plate which is fitted into the washing cells with a tight seat against all four walls at a level above the apertures or slots in the lower portion of the cylindrical wall of the vessel. A circular opening in the square divider plate slightly larger than the outside diameter of the washing vessel permits insertion of the washing vessel, thus serving the same function as the described water conduit.

If desired, the square cells may be used directly for the washing of the cylindrical sheet without the use of the washing vessel and conduit means, if suitable supporting means and bearings for the cylindrical support are directly provided in the cell.

The zig-zag flow pattern described hereinbefore may be altered in any desired way the same as the system of alternating under- and overflows to suit any desired requirements. As has been pointed out the water bath may also be designed without the integral heating chamber shown in FIGS. 30 and 31 and the temperature conditioned water may be taken from any desired source including a separate heating chamber, water mixing valve and so forth.

The vessels, sectional wall divisions forming the cells, and the overflows and underflows, washing vessels and other parts making up this apparatus are preferably inserted exchangeably. This permits ready rearrangement of the parts to accommodate any other flow pattern of the stream of water and thus of the sequence of steps. The number of basic units may be higher or lower than that shown in the preferred apparatus. A similar apparatus may be combined with the eleven step apparatus if more than 11 steps are required. Or, the apparatus may be constructed in two or more units having any desired number and arrangement of the basic cells which units may be connected by tubing or pipes to permit passing of the water stream through the combined apparatus.

The operation of the apparatus comes readily to mind from the foregoing description of the apparatus and the various auxiliary devices and means. The operator opens the water supply, takes Temperature Reading A, adjusts the heat-input on the switching device in accordance therewith, fills the respective vessels with the required treating solutions and prepares his photographic sheet material for the treatment, e.g. by exposing the sheet in an enlarger containing the negative material. As soon as the eating solutions in the vessels have acquired the exact treating temperature he may begin with the multistep treatment. He places and fastens the cylindrical sheet onto its support, which is preferably of the closed drum-type, inserts it into the first vessel 430 where it is left for the required length of time. From there it is transferred to vessel 436. After passage of the required time it is transferred to vessel 431 and so forth in a zig-zag pattern by alternation between the two parallel rows of vessels until it has been treated in the last vessel 435, from where it is removed for drying and other after treatment. The zig-zag arrangement was found preferable for the practical operation of the process. The displacement of the vessels in one of the rows by one half the distance of the vessels from each other in its row makes it virtually impossible that even the inexperienced operator would confuse the order of the steps or inadvertently omit or repeat a step. The simplicity of the arrangement of this modification of the invention reduces the complex eleven step color positive printing process to an automatic easy procedure enabling even the little experienced or the unexperienced amateur to attempt the heretofore difficult color developing processes with satisfactory results.

If desired, the bath may be simplified and designed to contain the vessels or troughs without the expedient of the cellular subdivision. One or more washing areas may be established in the same bath or in a separate bath or container which latter may be completely separate from the bath containing the vessels with the processing liquids. The washwater may be supplied from the latter bath by connecting tubing or piping or it may be supplied from an independent temperature controlled source of water. However, the advantages given hereinbefore make, for most applications, the unitary bath containing processing vessels and washing vessels in one unit and using a common stream of water for temperature control and washing the most desirable.

For large size sheet materials the size of the unitary bath might be larger than is desirable for easy handling and storing. In this instance the double row arrangement with its zig-zag operating pattern may be retained by simply dividing the bath along a line parallel to the shorter sides of the bath as has been explained hereinbefore. The two or more units thus obtained may be connected by suitable conduit such that one single source of the temperature controlled water serves all units. This latter arrangement was found to be especially suitable for the very large sizes of sheet material such as sheets of 16 by 20 inches or larger.

Another version of the composite multistep apparatus of the present invention utilizes the horizontal trough described hereinbefore. The trough may likewise be arranged in a common water bath the width of which is slightly exceeding the length of the individual troughs. The troughs are preferably inserted in one row in such manner that their longitudinal axis runs parallel to the narrower side walls of the bath. The individual troughs are advantageously spaced apart from each other, usually by an inch or more to avoid contamination of the baths by splashing of the chemical solutions. As in the "upright vessel" arrangement the temperature of the solutions in the horizontal troughs may be controlled by a stream of temperature controlled water surrounding and passing by the troughs. To better control the flow of the surrounding temperature controlled water, baffles are advantageously provided between each trough such that individual cells are formed along the length of the bath. In order to avoid the formation of water pockets and to assure best possible temperature control, the water should flow along a zig-zag pattern by alternating underflows and overflows along the path of the water from cell to cell. Each cell contains one of the horizontal troughs. So for instance, if the water enters the first cell at the bottom part, the separating wall between the first and second cell is made lower than the water level, so that the stream of water flows over the upper edge of the separatory wall, preferably over its entire or nearly its entire width. The separating wall between the second and the third cell in turn extends to the height of the upper edge of the water bath but leaves a gap at the bottom in form of a slot extending over the entire or nearly the entire width of the bath. The next separatory wall is closed at the bottom and extends just below the desired water level in the bath permitting the water to flow over its upper edge and so forth.

The separatory walls may be fixedly joined to the bath, or, they may be removably inserted in vertical slots provided in or at the longer sidewalls of the bath at the desired spacing. The indentations may extend also along the bottom of the bath to provide a relatively close seal around the walls and the bottom of the bath, so that the desired flow pattern is not lost.

If desired, some of the horizontal modified washing troughs may be used for the intermediary and final washing steps as has been described hereinbefore. In the alternative, the washing steps may be carried out directly in the cells, containing no trough. The cells may for this purpose be modified by the provision of bearings on each of the narrow sides, corresponding in their arrangement and dimensions exactly to those provided in the troughs, so that they are capable of receiving and rotatably supporting the axle or axle stumps of the cylindrical support containing the cylindrical sheet. In order to make the washing more effective, baffles may be provided at each side or on one side of the axle, parallel thereto and in horizontal or in slanted position so that the cell is divided into the center compartment containing the circular sheet and in one or more outer compartments. The upper opening left between the two baffles should be somewhat wider than the diameter of the cylindrical sheet. The upper edges of the baffles should preferably be positioned exactly opposite the widest part of the cylindrical sheet when the latter is inserted in operating position. If the baffles are shorter so that the upper edges lie in a position below the widest diameter of the inserted cylindrical sheet, the edges may extend further inward. In either case, if possible, only a narrow slot should be left on either side between the upper edge of the baffle or baffles and the surface of the inserted cylindrical sheet. The inner compartment must have an opening at its lower portion, preferably close to the bottom of the compartment, connecting it with the stream of water flowing through the bath. The water stream will flow upwards or downwards, as the case may be, through the slot, passing at a relatively high flow rate by and over the surface of the circular sheet to be washed. Rotation or rotatable reciprocation of the sheet around its axis assists in the washing action, rendering it more effective.

The effectiveness of the washing step will be further increased if the baffles are provided with curved sections following the contours of the cylindrical sheet, leaving only a small gap or space between the inner baffle walls and the surface of the cylindrical sheet. The opening at the bottom of the compartment has advantageously the shape of a narrow slot extending over the whole width of the cell. The slot should preferably be at least double as wide as the cross section of the space provided between the surface of the cylindrical sheet and the inner surface of the curved baffle. The operation of this modification of the apparatus is similar to that described hereinbefore.

In another modification of the invention, the general waterbath is designed as a circular bath 500, wherein the required number of upright vessels 501 e.g. 6 or 7 vessels are placed in a circular arrangement along the outer wall 502 of the bath. This leaves a central section in the bath which may serve as the washing area. An upright washing vessel 503, of the type described and shown hereinbefore, may be placed into the center section in order to make the washing procedure more effective. Furthermore, each vessel may be surrounded by partitions or divisional wall sections 504, 505, and 510 similarly as described in the foregoing with respect to the rectangular bath. The separatory walls thus form individual, wedge-shape cells 506 around each vessel, leaving a polygonal center section 507. If streaming, temperature conditioned water is used as the medium to control the temperature of the upright vessels in this modification of the apparatus the stream of water may enter into one of the outside cells trough inlet 508 near the bottom of the cell, thereafter taking a circular path from cell to cell. For the reasons outlined hereinbefore, overflows the partitions 505 and underflows the partitions 504 are with advantage provided in each cell so that a continuous flow pattern is established as described hereinbefore. If the stream of water enters the cell in a position near the bottom it leaves it at a higher position, preferably in a position close to the water level or vice versa. Finally, the water stream, after having passed through all the cells in the outer circle, enters the cell in the center, where it serves as the washing medium. Depending on the requirements of the process, the wash water may pass through the washing cell in an upward or downward flow pattern, as the case may be. The water stream leaves the central washing cell through suitable conduits 509 to be disposed of in a sink or similar means. The circular bath may be stationary or it may be rotatable around its central vertical axis, so that the vessel which is in use at any one time, may be located in the front portion of the bath. To carry the cylindrical sheet through all the steps of the process it is only necessary to transfer it either clockwise or counter clockwise from one vessel to the next, the former mode of transfer being preferred for obvious reasons.

The cylindrical support contained in any of the upright vessels employed in this modification of the invention may be mechanically connected to suitable driving means, such as a chain, ribbon or belt which means preferably travel in a circular pattern either in a wider outer circle or in a smaller inner circle. In either case the direct driving means travel on gears, pulleys rolls or similar rotatable supports which are provided in relatively close intervals e.g. one each at each junction of the radial cell walls with the outer wall sections of the bath or with the inner separatory wall sections. The movement of the said driving means may be either continuous and unidirectional or it may be reciprocating. Gear teeth, protrusions or other means may be provided on the driving side of the driving means to transfer the mechanical energy to suitably shaped driving means provided above the upper edge of the cylindrical sheet and fixedly connected with the support of the sheet. In the alternative, the mechanical energy may be transferred to the support of the cylindrical sheet simply by friction, whereby, for instance, a belt engages on the radial surface of a smooth or roughened roll or friction gear which is fastened horizontally on the upper end of the axle or upper axle stump of the cylindrical support.

The apparatus and device of this invention may be constructed of a variety of materials. Those parts of the construction which merely serve as supports and are not contacted during the operation with chemicals other than those contained in the tap water used as the temperature conditioning medium and in the wash-water may be made in conventional manner from copper, brass, steel or other suitable metals or from a variety of plastics, glass or other inorganic construction materials available for this purpose. The water bath may likewise be constructed from metals such as steel or sheet iron with or without protecting coatings such as enamel, metal plating, plastic coatings or paints or if desired from stainless steel, copper, brass with or without protective layers, hard rubber, plastics, etc. As stated, resistance to chemicals is of minor importance with these parts of the apparatus, while rigidity and mechanical stability are of prime importance. The preferred materials for the construction of the heating elements are metals, which may be used to form a sheath or cover around the heating elements carrying the electric currency. Proper insulation between the heating elements and the water-tight sheaths or covers is of importance in order to render the operation safe from the point of view of shock and leakage of electric current.

The vessels or troughs used in the apparatus are constantly contacted with the various processing liquids used in the process. Some of the liquids encountered in photographic processes are rather corrosive and careful selection of the materials for the construction of these parts of the apparatus is therefore indicated. The use of separate individual containers for each step of the process makes it possible to use materials of varying composition and chemical nature for each individual vessel or trough which are especially adapted to the character and corrosiveness of the liquids used in each of the individual containers. Considerable savings in the construction of the apparatus are thus possible, because usually the more resistant amterials are higher priced. Detailed instructions for the selection of construction materials for photographic equipment are contained in a booklet published by the Eastman Kodak Company in 1957 under the title: "Construction Materials for Photographic Processing Equipment." This booklet and the original literature cited therein provide a wealth of data and information which may be applied with advantage in the selection of the most suitable and economical construction material for the apparatus, and particularly for the treating vessels and troughs of the present invention.

The materials generally used for the construction of photographic darkroom efuipment are impermeable to light. This type of material assists greatly in the prevention of harmful stray light falling onto the light-sensitive sheets in the early steps of processing. The upright vessel, for instance, may be made even safer with respect to undesired light-effects by providing a cover or lid over the top opening which function may be served, for instance, by the star-shaped gear described hereinbefore. Light-tight or substantially light-proof construction enables the operator to carry on other operations in the darkroom which require or produce harmful light such as the exposure of photographic sheet material in a photographic enlarger, the inspection of prints from an earlier run under subdued white light or similar operations necessary in the course of the process. This particular advantage in combination with the semi-automatic operation of the process as described hereinbefore give the operator more flexibility and permit greater production in a given time. This preferred embodiment of the invention is thus particularly useful in the tedious multi-step processing operations which heretofore, when carried out by hand, have not permitted any worthwhile output in relation to the time expended.

If desired, the compact apparatus of the invention may be enclosed in a light tight box or enclosure which need be opened only for the transfer of each cylindrical sheet to the next processing vessel. The transfer may also be effected by suitable forwarding means which can be operated from the outside of the box without a need for opening the enclosure during the operation of the process. With this expedient the whole operation can be carried out in a lighted room.

If the exclusion of light is of no concern because the treatment operation is to be carried out under the lighting of a source of light which is safe to the particular material used, the vessels may be made of glass or clear plastic and inserted in a transparent water bath. This modification permits observation of the progress of any of the steps, particularly of the critical developing steps. A directional safe light designed for this purpose may be pointed, if desired, for short periods of time toward the cylindrical sheet, revealing the progress of development or other treatment. The convenience of following the progress of the treatment by visual inspection may be of high value in critical work. Of course, the clear vessel method may be combined with the light tight version e.g. by having only appropriate sections of the water bath and vessel or trough made from transparent material which is normally covered by light tight material which will be removed only for occasional inspection.

Many photographic treatments capable of being carried out in the apparatus of the present invention will be benefited by the provision of an accurate timer with each step. The commercially available electric or spring-actuated timers are rather expensive, considering the desirability of having one each provided for each treating step. The present invention provides a simple and inexpensive device which can be readily associated with each treating vessel or trough as to permit the timing of each step. In its simplest form this device comprises a base, a springloaded lever and a gear with a circular section cut out trough which the lever penetrates. The springloaded lever is held in its loaded position by a protrusion which rests against the edge of the circular cutout in the gear. The gear is progressively rotated, by the action of the means rotating the cylindrical sheet e.g. by progressing by one "tooth" for each full rotation or reciprocal movement respectively of the cylindrical support. Thus the cylindrical cutout is gradually moving in one direction relative to the position of the fixed springloaded lever. The number of rotations is correlated to the total duration of the treatment of the particular step and the gear is designed in such manner that the total number of gear teeth is equal to the number of rotations or reciprocations of the cylindrical sheet or any desired multiplicity thereof. The gear teeth are dimensioned so that they cover a section of the gear which is less than 360°. The circular cutout covers an equal sector of the gear and is widened at the end of this sector. Thus if the gear has rotated from its starting or zero point for the predetermined length of time by the corresponding sector the springloaded lever is no more held in its loaded position because the protrusion falls now into the wider portion of the cutout where it has no more support. Reaching this point, the lever thus pops up, after passage of the predetermined time, indicating the end of the particular treating step. The motion of the lever at this point may be coupled with an electric circuit which by being closed at this moment may actuate a bell or a visual signal, relieving the operator of any attention during the processing. If the next cylindrical support is inserted into the same vessel it is only necessary to press the lever down through the cutout and return the gear to its starting position to start a new cycle of timing.

If it is desired to run a different step of a different length of time in the particular timed vessel or trough it is only necessary to exchange the gear by one which is designed to indicate the passage of time now desired e.g. by changing the number of gear teeth correspondingly. If each of the treating vessels or troughs is provided with its own timing device in this manner the operator is relieved of time watching and following up in the various durations of the various steps, particularly if several cylindrical sheets are processed in one and the same apparatus in successive phasing.

The operation is further simplified if the insertion of the cylindrical support automatically effects the return of the gear to its zero point and starts the timing device. In this manner highest accuracy and reproducibility can be achieved without particular attention of the operator. Of course any other available timing device may be adapted to be incorporated into the operation of the process of the invention in similar manner.

As many prints as desired can be processed successively and simultaneously, the only limitation being that each new sheet should be inserted in the first step at time intervals which are not shorter than the time required for the step of the longest duration. Kodak's Ektacolor positive printing process requires 12 minutes for the first development step which is of longer duration than any of the other steps. The apparatus and process of the invention thus permit to start the treatment of 5 prints per hour in one device, without any undue strain on the operator if the timing devices of the present invention are used in each step.

The advantages of the successive processing over the heretofore practiced batchwise method come readily to mind. Maladjustment of the processing conditions or mistakes in the choice of filters, exposure, temperature etc. become apparent after running a single print. Adjustments can readily be made as the processing goes on, while a whole batch might be lost before any error or mistake is discovered in the batch-method of the prior art.

For the convenience of the less experienced operator some additional modifications of the process and apparatus of the present invention may be made. In order to avoid or prevent errors in the sequence of applying the treatment solutions in the individual steps, particularly in the multistep color developing process, the vessels or troughs and the storage bottles may be color-coded. Selecting one and the same color for the labels, caps etc. of packages or bottles containing the ingredients for that particular solution, for the storage bottles containing the prepared treatment solutions and for the vessel or trough to be used for the particular step and its section of the water bath where it is to be placed makes it virtually impossible that mistakes in the proper sequence of the steps of the particular process are made.

The code color may appear on the outside or inside or on both sides of the vessel or trough. Usually it is sufficient if only the upper portion of the vessel or trough is marked in this manner. Generally it is desirable that the colors selected are such that their distinction remains perceivable in the monochromatic light usually employed in the darkroom for the particular process in question. The effectiveness of the color coding means may be further improved by the provision of geometrical designs in the marking areas, such as dots, lines, crossing lines, circles, squares etc. These in combination with a few colors or simply black and white areas which are clearly distinguishable in the darkroom light permit complete marking and distinction of a multitude of treatment solutions and their storage and treatment containers.

Another helpful modification of the process and apparatus comprises marking of the inside wall of the vessel or trough to indicate the proper and most favorable level of the treating liquid in the vessel or trough before the insertion of the cylindrical support with the cylindrical sheet to be treated. This expedient permits the filling up of the treating liquids and the maintenance of the liquid at a level which will assure complete submergence of the cylindrical sheet without the risk of overfilling and overflowing of excess liquid upon the insertion of the support. This is particularly important with the closed drum-type, liquid-saving support where the liquid level in the vessel or trough is relatively low before the insertion of the support. Effective and easily recognizable marking may be readily achieved by the provision of contrasting rings, preferably black and white. In the alternative, black or dark coloring of the wall of the bottom section which is to be filled and a white or very light coloring of the upper section or vice versa readily permit the observation of the liquid level in the vessel or trough. This in combination with the provision of a contrasting ring around the inside of the wall of the vessel or trough may be combined to indicate the lowest and the highest permissible level of the liquid in the vessel or trough to assure complete submersion of the cylindrical sheet without the danger of spilling or overflowing of the liquid when the cylindrical support with the cylindrical sheet fastened thereon is inserted in operating position. To give an indication of the proper level of the liquid with the cylindrical sheet inserted a similar marking may be placed on the uppermost section of the inner wall of the vessel or trough. This may readily be achieved by combination with the above stated colorcoding markings which are extended from the top of the inner wall downwards to the proper level.

As is readily apparent, treating liquids accidentally flowing over or being spilled, particularly during the transfer of the cylindrical sheet will fall into the water bath surrounding the vessel or trough where they will be diluted and quickly washed away by the flowing stream of the temperature conditioning medium or water. Thus contamination of the sourrounding working area by harmful chemicals is virtually impossible.

According to another modification of the present invention, the apparatus may be used with advantage for the development of roll-film and similar materials, with only minor changes in the construction thereof. The upright vessel was found to be most readily adapted for he development of continuous film or paper materials. The vessel itself as well as the waterbath with the unique arrangement of a multiplicity of vessels and, if desired the expedient of the flowing water stream as a common temperature conditioning and washing medium may be employed unchanged in this modification of the invention. However, instead of using the cylindrical support as described hereinbefore one employs a modified support of the known type which is adapted to receive and support the film or band of photographic material and especially commercial roll-film in form of a spiral. The only limitation for the length of film material to be treated at once is the diameter of the vessel. Obviously, those designed for the treatment of the larger sizes of sheet material are capable of accepting greater lengths of film material such as a whole roll of 30 or more 24 x 36 mm. exposures, or of 8 6 x 9 cm. exposures of black and white or color film. Depending on the width of the film or paper material used in this modification of the invention two or more rolls of the continuous photographic material on their support may be stacked on one common vertical axle. The support for the continuous material should correspond in its outer dimensions exactly to that described for the cylindrical support for the cylindrical sheet material. This permits utilization of the various bearings centering and holding means as well as the means for relative movement of the support as was described above in connection with the cylindrical support. Thus one or several films may be treated in one and the same vessel with the same semiautomatic, reliable operational characteristics as have been described in the foregoing, giving inherently the same advantages for continuous photographic material and particularly for the multilayer negative and reversal color materials such as Ektachrome and Ektacolor film materials. Consistent results can readily be obtained in a semiautomatic operation also by the less experienced operator thanks to the exacting control of the processing conditions possible in the apparatus of the present invention.

Paper based bands of photographic material can likewise be treated on the modified support in quite similar fashion. This is of particular importance, if a great number of identical prints and particularly color prints is desired to be made with only a minimum of variation from print to print. Up to several dozen of prints, depending on the size of the individual print and on the dimensions of the apparatus available can be made in one operation in this manner, if they are contained on a continuous paper band, which is spirally wound onto a suitably modified support.

I claim:

1. An apparatus for the treatment of photographic sheet materials having a cylindrical configuration at constant temperature comprising as the principal components a waterbath, having at least one vertical wall and a horizontal bottom, a multiplicity of upright cylindrical treating vessels contained in the waterbath and at least one cylindrical closed drum-type support of a diameter slightly smaller than the inside diameter of the said treating vessels such that upon insertion of the drum-type support into any one of the cylindrical treating vessels a narrow annular void is formed between the interior wall of the vessel and the exterior wall of the closed drum-type support.

2. The apparatus of claim 1 in combination with means adapted to meter a stream of water of constant rate of flow and of constant temperature, heating means adapted to heat a stream of water or constant rate and temperature to a predetermined constant temperature, and fluid conduit connecting the metering and heating means with the water bath.

3. The apparaus of claim 2, wherein the treating vessels are cylindrical upright vessels arranged in at least one row.

4. Apparatus of claim 1 in which the annular void between the interior wall of the cylindrical vessel and the exterior wall of the closed drum-type support inserted therein is not less than a few millimeters and not more than a few centimeters thick.

5. Apparatus of claim 1 in which the annular void between the interior wall of the cylindrical vessel and the exterior wall of the closed drum-type support inserted therein is approximately one half inch thick.

6. Apparatus of claim 1 in which each vessel comprises means to removably and rotationally receive and hold the drum-type support.

7. Apparatus of claim 1 in which part of the upright cylindrical vessels are water wash-vessels of a shape and dimensions similar to but lower than those of the treating vessels, but comprising in the lower portion at least one aperture for the passage of wash water.

8. Apparatus of claim 1 in which the upright vessels are arranged in one row.

9. Apparatus of claim 1 in which the upright vessels are arranged in two parallel rows.

10. Apparatus of claim 9 in which one row of the upright vessels is displaced against the second row such that the vessels form a zig-zag pattern.

11. Apparatus of claim 10 in which part of the upright cylindrical vessels are water wash-vessels of a shape and of dimensions similar to but lower than those of the treating vessels and comprising in the lower portion at least one aperture for the passage of wash water.

12. Apparatus of claim 1 in which each of the upright vessels is contained in an individual cell which is formed by partitions and a section of one of the vertical walls of the waterbath.

13. Apparatus of claim 12 in which the individual cells are rectangular.

14. Apparatus of claim 13 in which the upright vessels are arranged in two parallel rows and in which one row of the upright vessels is displaced against the second row such that the vessels form a zig-zag pattern.

15. Apparatus of claim 14 in which each cell contains at least one aperture in the lower part of one of the partitions, said aperture communicating with one of the neighbouring cells and one of the partitions joining another neighbouring cell has a height slightly less than the remaining partitions which in turn have a height less than the upper edge of the upright treating vessels, so as to permit communication with said second neighbouring cell by overflow.

16. The apparatus of claim 15 in which the said aperture in the lower portion of the partition is connected to and leading into a waterconduit which is in turn dimensioned and designed to removably receive the water wash-vessel.

17. Apparatus of claim 16 which contains a number of cells and upright treating vessels and water wash-vessels, corresponding to the total number of treating and washing steps of the photographic multistep treating process to be effected in the apparatus and arranged in the order of the steps required in the process.

18. Apparatus of claim 17 which contains a number of cells and upright treating vessels and water wash-vessels, corresponding to the total number of treating and washing steps of the photographic treating process required for the development, fixing, washing and aftertreating of a multilayer positive color printing paper.

19. Apparatus of claim 16 in which the waterbath contains a water-inlet near the bottom and communicating with the cell containing the first treating vessel and a water outlet at the other end at a level below the upper edge of the partitions, but at a level higher than the upper edge of the shorter partitions providing the overflow in each cell, each cell being communicatively connected to one of the neighbouring cells by at least one aperture in the lower portion of one of the partitions forming the cell and to the other neighbouring cell by the shorter partition in such manner that a stream of water, entering the bath at the said inlet passes from cell to cell, alternating its path between overflow and underflow.

20. Apparatus of claim 19 in which the water wash-vessels are connected by the waterconduit in such manner that the stream of water passes through the water wash-vessels and from there into the cell in which said water wash-vessel is contained and from there into the next cell.

21. Apparatus of claim 20 in which the sectional wall divisions and the waterconduits are removably inserted in the waterbath in suitable sealing guide means to permit the establishment of any desired flow pattern of the stream of water and any desired order and number of treating and water wash-vessels up to the maximum capacity so as to accommodate any desired photographic development or treating process requiring a multitude of treating and washing steps.

22. Apparatus of claim 12 in which the waterbath is circular and in which each of the individual cells containing the upright treating vessels is pie-shaped.

23. Apparatus of claim 22 which contains a central cell surrounded by said pie-shaped cells, which central cell is free from upright treating vessel and which central cell contains a water-inlet and a water-outlet so as to permit the passage of a stream of wash water.

24. Apparatus of claim 23 in which the said central cells is provided with a water wash-vessel of a shape and of dimensions similar to but lower than those of the treating vessels and comprising in the lower portion at least one aperture for the passage of water which aperture is communicatingly connected through a waterconduit with one of the water-inlet and water-outlet contained in said cell, such that the stream of wash water passes through said water wash-vessel, forming upon the insertion of the closed drum-type support a narrow annulus of flowing water.

25. Apparatus of claim 24 in which said waterbath contains a water-inlet, communicating with the first of the pie-shaped cells, each pie-shaped cell being provided with at least one aperture in one of the partitions forming the cell while the opposite partition terminates at a level below that of the first partition, the last cell being communicatively connected to the central cell by said water-inlet provided in said central cell, so as to permit a flowing stream of water entering the first pie-shaped cell to pass through each of the pie-shaped cells and finally through the central washing cell and through the water wash-vessel inserted therein.

References Cited in the file of this patent

UNITED STATES PATENTS

| | | |
|---|---|---|
| 810,234 | Towers et al. | Jan. 16, 1906 |
| 920,263 | Burton | May 4, 1909 |
| 1,225,929 | Crabtree | May 15, 1917 |
| 1,274,651 | Windrim et al. | Aug. 6, 1918 |
| 1,772,834 | Hopkins | Aug. 12, 1930 |
| 2,349,823 | Howard | May 30, 1944 |
| 2,484,341 | Grover | Oct. 11, 1949 |
| 2,781,708 | Perlin | Feb. 19, 1957 |
| 2,947,235 | Faeber | Aug. 2, 1960 |
| 2,947,236 | Siegel | Aug. 2, 1960 |